United States Patent
Cherian et al.

(10) Patent No.: US 11,132,141 B2
(45) Date of Patent: Sep. 28, 2021

(54) SYSTEM AND METHOD FOR SYNCHRONIZATION OF DATA CONTAINERS

(71) Applicant: Ionir Systems Ltd., Tel-Aviv (IL)

(72) Inventors: Jacob Cherian, Tel-Aviv (IL); Nir Peleg, Tel-Aviv (IL)

(73) Assignee: IONIR SYSTEMS LTD., Tel Aviv (IL)

( * ) Notice: Subject to any disclaimer, the term of this patent is extended or adjusted under 35 U.S.C. 154(b) by 112 days.

(21) Appl. No.: 16/519,013

(22) Filed: Jul. 23, 2019

(65) Prior Publication Data
US 2020/0026431 A1  Jan. 23, 2020

Related U.S. Application Data

(60) Provisional application No. 62/701,865, filed on Jul. 23, 2018.

(51) Int. Cl.
*G06F 3/06* (2006.01)
*G06F 12/10* (2016.01)

(52) U.S. Cl.
CPC ............ *G06F 3/065* (2013.01); *G06F 3/0604* (2013.01); *G06F 3/0644* (2013.01); *G06F 3/0659* (2013.01); *G06F 3/0673* (2013.01); *G06F 12/10* (2013.01); *G06F 2212/657* (2013.01)

(58) Field of Classification Search
CPC ........ G06F 3/065; G06F 3/0673; G06F 12/10; G06F 2212/657; G06F 3/0604; G06F 3/0644; G06F 3/0647; G06F 3/0659; G06F 3/067; G06F 2212/65; G06F 3/061; G06F 3/0611
See application file for complete search history.

(56) References Cited

U.S. PATENT DOCUMENTS

| | | | |
|---|---|---|---|
| 2013/0227195 A1* | 8/2013 | Beaverson | G06F 3/064 711/103 |
| 2013/0258054 A1* | 10/2013 | Park | H04N 13/194 348/43 |
| 2015/0248402 A1* | 9/2015 | Patterson, III | G06F 11/1076 707/640 |
| 2017/0094341 A1* | 3/2017 | Berner | H04N 21/47217 |
| 2018/0260155 A1* | 9/2018 | Cherian | G06F 3/0673 |

* cited by examiner

*Primary Examiner* — Zhuo H Li
(74) *Attorney, Agent, or Firm* — Pearl Cohen Zedek Latzer Baratz LLP

(57) ABSTRACT

A system and a method of synchronizing, by a processor, between content of a first data container and content of at least one second data container may include: receiving one or more first data elements of the first data container and one or more second data elements of the at least one second data container; computing one or more first unique reference values (URVs) for the respective one or more first data elements; computing one or more second URVs for the respective one or more second data elements; storing the first data elements on a first storage element; storing the second data elements at a second storage element; comparing between a first URV and a second URV to identify data elements having diverged content; and synchronizing between content of the first data container and content of the at least one second data container based on the comparison.

20 Claims, 8 Drawing Sheets

SYSTEM AND METHOD FOR SYNCHRONIZATION OF DATA CONTAINERS

RELATED APPLICATION DATA

The present application claims priority from application 62/701,865, filed on Jul. 23, 2018 and entitled "SYSTEM AND METHOD FOR SYNCHRONIZATION OF DATA CONTAINERS".

FIELD OF THE INVENTION

The present invention relates generally to synchronization of data containers. More specifically, the present invention relates to using a transportable representation of data containers to synchronize the contents of data containers.

BACKGROUND OF THE INVENTION

Cloud storage systems have become ubiquitous for providing flexible, cost-effective storage resources. As known in the art, Information Technology ("IT") professionals commonly structure organizational storage systems on a plurality of storage resources, each manifesting specific benefits and/or limitations, relating to, for example the price of storage, accessibility to stored data, volume of supported storage, latency of data retrieval, optional upgrade of storage, and the like.

For example, IT professionals may choose to employ what is commonly referred to as a hybrid IT scheme, where dedicated storage resources such as private cloud resources and on-premise data centers may be combined with resources from a public cloud storage system.

In another example, IT professionals may choose to employ what is commonly referred to as a multi-cloud scheme, where storage resources may be combined from a plurality of public cloud storage systems.

In yet another example, IT professionals may choose to combine the hybrid IT scheme approach with that of the multi-cloud scheme, to produce any combination including a plurality of storage resources.

As known in the art, storing different copies of the same data set on a plurality of storage resources may require synchronization of copies that may have diverged over time. Such divergence commonly occurs because it may be impractical to keep all copies of the data set continuously synchronized.

For example, physical properties of the storage system (e.g., distance between copies), may cause a latency between different copies, and maintaining low latency links between storage resources may be expensive.

In another example, a client's workflow (e.g., when performing analytics on production data sets) may require independent, parallel computing that may inherently result in working on separate, non-synchronized data sets.

State-of-the-art storage systems normally address the synchronization of different copies of data sets by a synchronization process that may be time scheduled (e.g., as a repetitive process) and may include:

synchronizing the copies by copying stored data from one storage resource to another; or recreating all data set copies from a master copy.

Such state-of-the-art synchronization processes may be inefficient time-wise, due to the inaccessibility of data on one or more data resources until all the data has been transferred and synchronization has been completed.

In addition, state-of-the-art synchronization processes may include transferring of large amounts of possibly unnecessary synchronization data, as explained herein, and may thus be inefficient in relation to data traffic over computer networks.

As known in the art (and elaborated herein, e.g., in relation to FIG. 2), a data set or data container such as a volume, typically includes a definition of a root structure, a set of pointers to data blocks (associated with a respective set of volume blocks), and the blocks of the actual stored data. Each volume block may be associated with a physical address or location of a data block.

This means that in order to move or migrate a volume from one system to another, either the definition of the volume and the associated data may need to be moved as well, or the volume structure may need to be manipulated during the migration process. This is because at least location information (e.g., a physical addresses of a data block) on a source system that stores the volume may not be valid on a destination storage system. In other words, when moved from one storage system to another, the address (e.g., an offset in a disk address space) of a data block in a volume may, and typically does, change. Therefore, state-of-the-art synchronization processes where data is transferred from one storage system to another may be computationally inefficient, as explained herein.

Accordingly, state-of-the-art approaches, techniques, systems and methods are limited with respect to synchronizing the content of data sets and/or data objects such as files and/or storage volumes from one storage system to another.

SUMMARY OF THE INVENTION

Embodiments of the present invention may include a method and a system for synchronization of data containers, by which copies or versions of data elements which may have been stored on different storage elements and may have diverged over time from a common origin may be quickly (e.g., instantly or nearly-instantly) synchronized across storage elements, storage systems (e.g., cloud storage systems, data centers) and physical locations.

Embodiments of the present invention may include calculating, by at least one processor, a set of unique reference values (URVs), based on (e.g., as a function of) content of a respective set of data elements or segments (e.g., volume blocks) of a data container (e.g., a volume). Embodiments of the present invention may include storing, recording or including the URVs in one or more data structures that may be referred herein as transportable container representations (TCRs).

In various embodiments, the terms TCR, TCR metadata, TCR metadata structures, TCR metadata elements, and TCR tables may refer to transportable container representations and may be used herein interchangeably according to context.

According to some embodiments of the invention one or more storage elements may be content addressable storage (CAS) devices, where one or more stored data elements may be addressable or accessible (e.g., for storage and/or retrieval of data) via a unique content identifier corresponding to the respective data element's content. Additionally, or alternatively, one or more URVs may serve as unique content identifiers, such that storing and/or retrieving of one or more data elements from a storage element may be done using the respective one or more URVs as content identifiers. Accordingly, in some embodiments, the one or more TCRs may be regarded as a translation or abstraction layer between a logical address (e.g., an address within a software process) and a physical address (e.g., a physical location of storage) of a stored data element:

a. On one hand, in some embodiments, logical addresses of data elements or segments (e.g., data elements at specific offsets within a data container) may be mapped by the one or more TCRs to respective URVs, as elaborated herein.

b. On the other hand, in some embodiments, one or more URVs may serve as content identifiers and may thus be associated with respective one or more physical locations or addresses of a storage element or device.

For example, embodiments of the invention may receive (e.g., from a client computing device) a read-access request for a data element (e.g., a volume block). The request may include a logical address (e.g., a logical address of a data container, such as a volume and an offset for the data element within the data container). Embodiments of the invention may utilize the mapping of logical addresses to URVs (as elaborated herein, e.g., in relation to FIG. 3) to determine at least one URV. Based on the association of the at least one URV with a physical location or address of a data element, embodiments of the invention may retrieve the content of the requested data-element.

In some embodiments, a first copy of a data container (e.g., a file, a database table, a volume and the like), including a first set of one or more data elements may be stored on a first system, and a second copy of the data container, including a second set of one or more data elements may be stored on a second data storage system. The content of the first copy and the second copy may change over time. For example, one or more data elements or segments of a copy of the data containers (e.g., a volume block) may have been modified, edited, deleted and the like. The copies of data containers and/or data elements or segments may hereinafter be referred to as 'versions' (e.g., indicating a possible difference in their content). For example, the first copy and second copy may be copies of a data container which may have diverged over time from a common origin (e.g., a common ancestor data container) to respectively become a first version and a second version of the data container.

According to some embodiments of the invention, one or more (e.g., a plurality) of TCR metadata elements or TCR metadata structures may be stored on at least one storage system or storage element. One or more (e.g., each) TCR metadata element or structure may be associated with a respective stored copy of the data container. For example, a first TCR metadata element or structure, associated with the first copy, may be stored on the first storage system, and a second TCR metadata element or structure, associated with a second copy, may be stored on the second storage system. In some embodiments, the stored TCR metadata elements may be changed according to a change in a content of a respectively associated data container. For example, if a data element included within a data container is changed, the respective URV may be recalculated, and the respective TCR metadata element may be changed accordingly.

Embodiments of the present invention may further include: associating at least one URV with a timestamp, indicating a time at which a respective data element has been updated or changed; receiving (e.g. from a user, an application, and the like) at least one of: an indication of a source copy, an indication of a target copy and a divergence timestamp indicating the point in time in which the copies have diverged; identifying at least one difference between the source copy and target copy according to at least one timestamp associated with at least one unique reference value.

Embodiments of the present invention may further include updating the TCR metadata element associated with the target copy to match the TCR metadata element of the source copy. For example, for each identified difference between the TCR metadata elements of the source copy and the target copy, a URV may be copied from the TCR metadata element of the source copy to the TCR metadata element of the target copy, to achieve the required synchronization.

In another example, when synchronization to a predefined point in time is required, only URVs that correspond to the content of the source copy at the received divergence timestamp may be copied from the TCR metadata element of the source copy to the TCR metadata element of the target copy.

According to some embodiments of the invention, retrieving the requested data element may include: if the requested data element is stored by a local storage system receiving the read-access request, then retrieving the data from the local storage system; and if the requested data element is not stored by the local storage system receiving the read-access request, then using the storage system identifier to retrieve the data from a remote storage system.

According to some embodiments of the invention, a method of synchronization of data containers may include: receiving a write-access request, including a data element to be stored in the data container; calculating a URV for the data element; determining a container offset for the data element; storing the data element according to the determined container offset; and updating the TCR to include a mapping between the data container offset and the URV and associate a timestamp of the storage action to the unique reference value.

According to some embodiments of the invention, storing a data container on a storage system may include: receiving a write-access request, including a data container to be stored on the storage system, wherein the data container includes a set of one or more data elements; calculating a URV for the one or more data elements; determining a container offset for each of the one or more data elements; storing the set of one or more data elements on the storage system; and updating the TCR to include a mapping between each data container offset and the URV and an association of each URV with a timestamp of the storage action.

Embodiments of the present invention may include a method of synchronizing, by at least one processor or controller (e.g., element 105 of FIG. 1), between content of a first data container (e.g., element 133 of FIG. 1, element 133-A of FIG. 5) and content of at least one second data container (e.g., element 133-B of FIG. 5).

Embodiments of the method may include: receiving one or more first data elements (e.g., element 134 of FIG. 1) of the first data container and one or more second data elements 134 of the at least one second data container; computing one or more first URVs (e.g., elements 310 of FIG. 3) for the respective one or more first data elements and computing one or more second URVs for the respective one or more second data elements; storing the one or more first data elements on a first storage element or system (e.g., element 130-A of FIG. 5) and storing the one or more second data elements at a second storage element or system (e.g., element 130-B of FIG. 5); comparing between a first URV of the one or more first URVs and a second URV of the one or more second URVs to identify data elements having diverged content; and synchronizing between content of the first data container and content of the at least one second data container based on the comparison.

Embodiments of the present invention may further include maintaining a TCR table (e.g., element 131 of FIG. 3) that may include one or more entries, of which at least one (e.g., each) entry may include at least one of: a logical address of a stored data element; a mapping of said logical address to a respective URV; a timestamp, indicating a time at which a content of said stored data element has been written; and a storage system identifier (SSI), identifying a storage element in which said data element has been stored.

According to some embodiments of the invention, synchronization between content of the first data container and content of the at least one second data container may include at least one of: copying a content of a diverged data element from the first storage element to the at least one second storage element; and copying a TCR table entry pertaining to a diverged data element from the first storage element to the at least one second storage element.

Additionally, or alternatively, embodiments of the present invention may include: comparing between a first timestamp of a first TCR table entry pertaining to a first stored data element and a second timestamp of a second TCR table entry pertaining to a second stored data element to determine a divergence time, in which content of the first data element and content of the second data element have diverged.

Additionally, or alternatively, embodiments of the present invention may include synchronizing between content of the first data container and content of the at least one second data container based on the divergence time, as elaborated herein.

Embodiments of the present invention may include receiving a data access request that may include a logical address. Comparing between the first timestamp and second timestamp may include identifying the first TCR table entry and second TCR table entry based on the logical address.

Embodiments of the present invention may include receiving a snapshot timestamp. Synchronizing between content of the first data container and content of the at least one second data container may be performed based on the snapshot timestamp, to bring or cause the content of the at least one second data container to comprise snapshot data corresponding to the snapshot timestamp, as elaborated herein.

Additionally, or alternatively, synchronizing between content of the first data container and content of the at least one second data container may include bringing or causing the content of the at least one second data container to include data corresponding to the later timestamp between the first timestamp and the second timestamp.

Embodiments of the present invention may further include: receiving a read-access request for a stored data element, the request may include a logical address; identifying a first TCR table entry that may pertain to a first stored data element and may include the logical address; identifying a second TCR table entry that may pertain to a second stored data element and may include the logical address; comparing between a first timestamp of the first TCR table entry and a second timestamp of the second TCR table entry; selecting a TCR table entry based on the comparison; and responding to the read-access request based on the selected TCR table entry.

The response may include at least one of: a content of a data element corresponding to the selected TCR table entry; an SSI of the selected TCR table entry; and a URV of a data element corresponding to the selected TCR table entry.

In some embodiments, at least one of the first storage element and second storage element may be a CAS device, where storing one or more data elements may be done using the respective one or more URVs as a content identifier.

Embodiments of the present invention may include a method of managing data storage on a plurality of storage elements. Embodiments of the method may include: receiving, at a first timing, a first version of a data element associated with a logical address; computing a first URV based on content of the first version; storing the first version on a first storage element; receiving, at a second timing, at least one second version of the data element associated with the logical address; computing at least one second URV based on content of the at least one second version; storing the at least one second version on at least one second, respective storage element; receiving a data access request that may include the logical address; selecting between the first version and the at least one second version based on at least one of: the first URV, the at least one second URV, the first timing and the second timing, and responding to the received data access request based on the selected version.

Embodiments of the present invention may include maintaining one or more TCR metadata structures. One or more (e.g., each) TCR metadata structure may include one or more metadata entries.

In some embodiments, one or more (e.g., each) metadata entry may correspond to a stored version of a data element, and may include at least one of: a mapping of a logical address of the data element and a respective URV of the version of the data element; a timestamp, corresponding to a time of storage of the version of the data element; and an SSI, identifying a storage element in which the version of the data element has been stored.

Embodiments of the present invention may include comparing between contents of one or more metadata entries to determine a condition in which the content of the first version and the content of at least one second version have diverged over time. Additionally, or alternatively, embodiments of the present invention may include retrieving the content of one of the first version and the at least one second version based on the comparison.

Embodiments of the present invention may include maintaining a first TCR metadata structure on the first storage element; maintaining at least one second TCR metadata structure on a respective at least one second storage element; comparing between content of one or more metadata entries of the first TCR metadata structure and content of at least one second TCR metadata structure to determine a condition in which the content of the first version and content of at least one second version have diverged over time; and synchronizing a content of at least one TCR metadata structure based on the comparison.

Embodiments of the present invention may include maintaining a first TCR metadata structure that may include one or more first metadata entries on the first storage element; maintaining a second TCR metadata structure that may include one or more second metadata entries on the second storage element; identifying a first metadata entry and a second metadata entry that include an equivalent logical address but a different URV; and copying a content of the identified first metadata entry from the first TCR metadata structure to the second TCR metadata structure to synchronize the contents of the first TCR metadata structure and the second TCR metadata structure.

Embodiments of the present invention may include copying a content of a version of a data element that may correspond to the first metadata entry from the first storage element to the second storage element, to synchronize content of the first storage element and second storage element.

In some embodiments, one or more TCR metadata structure may be globally stored on a computing device that may be associated with the first storage element and with at least one second storage elements. At least one metadata entry of the globally stored TCR metadata structure may include at least one identifier, that may represent a storage element, so as to associate between a specific logical address, a respective URV and a respective storage element.

Embodiments of the present invention may include a method of synchronizing content of a data storage system. Embodiments of the method may include: receiving at least one data element; computing a URV based on a content of the at least one data element; storing copies of the at least one data element on a plurality of CAS devices according to the URV; maintaining a TCR that may include one or more entries, where each entry may correspond to a stored copy of a data element and may include a mapping of a logical address of the stored copy to a respective URV; comparing between contents of one or more TCR entries to determine a condition in which a content of the stored copies of the at least one data element has diverged over time; and synchronizing content of the at least one stored copy of a data element between a first CAS device and one or more second CAS devices based on the comparison.

In some embodiments, local copies of the TCR may be locally stored on the first CAS device and on the one or more second CAS devices. Synchronizing the content of the at least one stored data element may include: identifying one or more TCR entries that may include an equivalent logical address but a different URV, between the local copy of the TCR of the first CAS device and one or more local copies of the TCR of the one or more second CAS devices. Additionally, or alternatively, embodiments of the present invention may include copying a content of the one or more identified TCR entries from the first CAS device to the one or more second CAS devices.

In some embodiments, synchronizing the content of the at least one stored data element may include replacing a content of a stored data element corresponding to an identified TCR entry of the one or more second CAS devices with a content of a stored data element corresponding to the identified TCR entry of the first CAS device.

Maintaining the TCR may include attributing a timestamp corresponding to a time of a change in a value of a stored copy of a data element. Additionally, synchronizing the content of the at least one stored copy data element may be done according to the timestamp.

According to some embodiments of the invention, at least one received data element may be a data container that may include one or more data segments and computing a URV may be performed per each data segment. One or more TCR entries may include a mapping of a logical address of a data segment to a respective URV and synchronizing content of a stored data element may include copying a content of at least one data segment from a first CAS device to one or more second data segments stored on one or more second CAS devices.

The data container may be or may include, for example: a block storage volume, a file and an aggregation of data that may be specific to an application. A logical address of a data segment may include, for example a logical base address of the data container and/or an offset that may be specific to the data segment.

The TCR may be globally stored on a computing device that may be associated with the first CAS device and with the one or more second CAS devices. At least one entry of the TCR further may include at least one SSI, indicating a CAS device where a respective copy of a data element may be stored.

According to some embodiments of the invention, synchronizing the content of the at least one stored data element may include: identifying a first TCR entry and a second TCR entry, where the first TCR entry may include a first logical address, a first URV and a first SSI corresponding to the first CAS device, and the second TCR entry may include a second logical address that may be equivalent (e.g., equal) to the first logical address, a second URV that may be different from the first URV and a second SSI that may correspond to one of the one or more second CAS devices. Additionally, or alternatively, embodiments of the present invention may include replacing a content of a copy of a data element that corresponds to the second TCR entry on the CAS device corresponding to the second SSI with a content of a copy of a data element that corresponds to the first TCR entry on the CAS device corresponding to the first SSI.

Embodiments of the present invention may include a system for synchronizing between content of a first data container and content of at least one second data container.

Embodiments of the system may include: a non-transitory memory device, where modules of instruction code may be stored, and a processor and/or controller associated with the memory device and configured to execute the modules of instruction code.

Upon execution of the modules of instruction code, the processor may be configured to perform at least one of: receive one or more first data elements of the first data container and one or more second data elements of the at least one second data container; compute one or more first URVs for the respective one or more first data elements and compute one or more second URVs for the respective one or more second data elements; store the one or more first data elements on a first storage element and store the one or more second data elements at a second storage element; compare between a first URV of the one or more first URVs and a second URV of the one or more second URVs to identify data elements having diverged content; and synchronize between content of the first data container and content of the at least one second data container based on said comparison.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
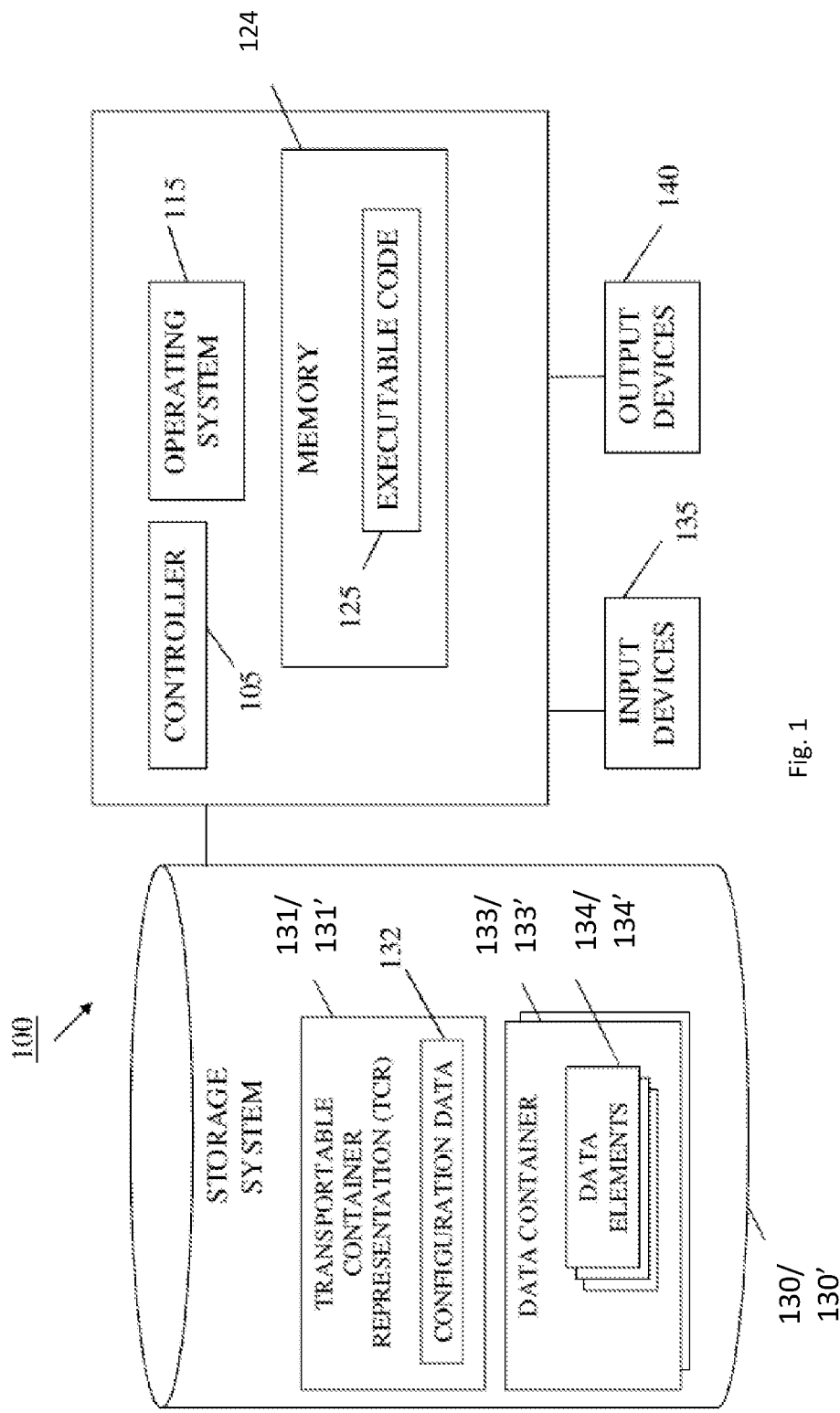
FIG. 1 is a block diagram, depicting a computing device which may be included in a system for synchronization of data containers according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium or device that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system by which copies of data which may have diverged over time from a common origin can be instantly synchronized across clouds, data centers, and locations.

The terms data set and data container may be used herein interchangeably and may refer to any type of one or more data elements that may be stored, e.g., on a storage device or resource. For example, a data container may include a stored block volume, a file, a data object and/or any application-specific data element.

The term "storage element" may be used herein, according to various embodiments, to refer to a storage device (e.g., a hard disk drive (HDD) device, a solid-state storage device (SSD), a FLASH storage device and the like), storage media (e.g., including one or more storage devices) and a storage location (e.g., a division within a storage device).

The term 'synchronization' may refer herein to a process that may include: (a) comparison among two or more references to respective data sets and/or data elements that may be stored in a plurality of locations (e.g., on a plurality of storage elements); (b) identification of at least one difference among the compared references, either in a current state or at a previous point in time; and (c) utilizing the identification of the at least one difference to modify a content of at least one data element (e.g., a 'target' data element) to be equivalent to that of another data element (e.g., a 'source' data element).

Reference is made to FIG. 1, showing a high-level block diagram of a computing device or system 100 according to some embodiments of the present invention. Computing device 100 may include a controller 105 that may be, for example, a central processing unit processor (CPU), a chip or any suitable computing or computational device, an operating system 115, a memory 124, executable code 125, input devices 135 and output devices 140.

In some embodiments, computing device 100 may include or may be associated with (e.g., by any type of data communication as known in the art) a storage system 130. As shown, storage system 130 may include one or more TCR elements 131 (e.g., 131, 131') that may include or may have stored therein configuration data 132. As further shown, storage system 130 may include or may have stored therein one or more data container elements 133 (e.g., 133, 133') that may include a plurality of data elements 134 (e.g., 134, 134', respectively). Only a single storage system 130 is shown in FIG. 1; however, it will be understood that any number of storage systems similar to storage system 130 may be included in a system according to some embodiments of the invention. For example, as elaborated herein (e.g., in relation to FIG. 5), TCR 131 may be stored in a first storage system and data container 133 may be stored in a second, (e.g., remote) storage system, e.g., one connected to a remote computer that may communicate with computing device 100 over a computer network. For the sake of clarity and simplicity, only one TCR 131 and one data container 133 are shown, however, it will be understood that any number of TCRs 131 and data containers 133 may be included or stored in or connected to a system according to some embodiments of the invention.

According to alternative embodiments, TCR 131 may be stored in any memory and/or data storage device associated with computing device 100. For example, TCR 131 may be stored in memory module 124, associated with controller 105.

Controller or processor 105 (or one or more controllers or processors, e.g., across multiple units or devices) may be configured to carry out methods as described herein, and/or to execute or act as the various modules, units, etc., for example by executing software or code. It should be noted that the one or more controllers or processors may have the same reference number (e.g., 105) to indicate that they may be the same component or an equivalent component in different computing devices.

According to some embodiments of the invention, a first controller 105 (e.g., in a first server or storage system) may include in a TCR a set of unique reference values (URVs) that may be calculated based on content of the respective set of data elements of a data container (e.g., as a cryptographic hash function of the content, or any other appropriate mechanism known in the art). In some embodiments, first controller 105 may: (a) associate (e.g., by any appropriate data structure, such as a table) one or more of the URVs with one or more physical locations of one or more respective, stored data elements 134; and (b) map (e.g., by any appropriate data structure, such as a table) data at specific offsets (e.g., logical address offsets) in the data container to the URVs.

In some embodiments, first controller 105 may send or otherwise copy or transport one or more (e.g., a plurality or all) parts or elements of the TCR to a second, e.g., remote, server or storage system. A second controller 105 in the second server or storage system may receive a read-access request for data (e.g., a data container, one or more data elements within a data container, etc.). The request may include a read logical address offset in the data container. The second controller 105 may use the mapping in the TCR received from the first server or storage system to determine at least one URV that may correspond to the read logical address offset in the data container. Second controller 105 may retrieve the requested data based on, e.g., an association of the at least one URV with a physical location of a data element. For example, second controller 105 may determine that the requested data is stored locally (e.g., on a storage device associated with second controller 105) and retrieve the stored data therefrom. Additionally, or alternatively, second controller 105 may determine that the requested data is stored remotely (e.g., at the first storage system, associated with first controller 105), and may communicate with the remote storage system (e.g., with first controller 105) to retrieve the data therefrom.

Accordingly, embodiments of the invention may include a first controller or computer that may cause a second controller or computer to perform its tasks faster and/or more efficiently. For example, using the TCR provided by first controller 105 in the above example, second controller 105 may retrieve data and/or respond to a data access request in an optimal manner.

In this context, the term 'optimal' may refer, for example, to a latency of data retrieval. For example, an embodiment of the invention may be adapted to retrieve the requested data element from a local storage element (e.g., a local storage system or device) if an up-to-date version is present at the local storage system or device. Otherwise, an embodiment of the invention may be adapted to retrieve the requested data element from a remote storage element (e.g., a remote storage system or device).

In some embodiments, controller 105 may associate a timestamp to at least some of the URVs of each of the plurality of TCRs, corresponding to a time of change of a respective data element. For example, when a data element associated with a specific offset in the data container is overwritten, its URV may be recalculated and may be changed, and the URV may be associated with a timestamp representing the time of change and/or the time of the write operation.

In some embodiments, a first copy of a data container, including a first set of one or more data elements, may be stored on a first storage system, and at least one second copy of the data container, including a second set of one or more data elements, may be stored on at least one second data storage system. Embodiments of the method may include storing (e.g., by one or more controller 105) a plurality of TCRs, wherein each TCR may be associated with a copy of the data container. For example, a first TCR may be stored in, or associated with, the first storage system, and a second TCR may be stored in, or associated with, the second storage system.

In some embodiments, controller 105 may synchronize between different copies of the data container. Synchronization may be prompted, for example, by a request that may be received from a user and/or application. For example, a user may require synchronizing a first copy of a data container (e.g. a volume) that may be stored on a local storage system, e.g., so as to match between the content of the local copy and that of a second copy stored on a remote storage system.

In another example, synchronization may be prompted by an event (e.g., a read-access request received from a client computer), or during an offline process (e.g., 'lazily', as commonly referred to in the art).

In some embodiments, more than one computing device 100 may be included in, and one or more computing devices 100 may be, or act as, the components of, a system according to some embodiments of the invention.

Operating system 115 may be or may include any code segment (e.g., one similar to executable code 125 described herein) designed and/or configured to perform tasks e.g., involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 124 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 124 may be or may include a plurality of different memory units. Memory 124 may be a computer or processor non-transitory readable medium, or a computer non-transitory storage medium or device, e.g., a RAM.

In some embodiments, executable code 125 may be any executable code, e.g., an application, a program, a process, task or script. Executable code 125 may be executed by controller 105, for example, under control of operating system 115. An embodiment may include a plurality of computing devices, storage systems and/or servers that may include a respective plurality of controllers 105 and/or executable codes 125. For example, a first portion of executable code 125 may be an application that creates, updates and/or maintains a TCR 131 on a first system or machine (e.g. one of storage systems 504 described herein with reference to FIG. 5) and a second portion of executable code 125 may be an application that receives a TCR 131, e.g., on a second, remote system or machine (e.g. another, different one of storage systems 504) and uses the TCR 131 to store and retrieve data on the second or remote system as further described herein. Although, for the sake of clarity, a single item of executable code 125 is shown in FIG. 1, a system according to various embodiments of the invention may include a plurality of executable code segments similar to executable code 125 that may be loaded into memory 124 and configure controller 105 to carry out various methods described herein.

Storage system 130 may be or may include, for example, a hard disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 124 where it may be processed by controller 105.

For example, TCR 131 or configuration data 132 may be loaded into memory 124 where they may be updated, modified and/or used by controller 105 as described herein. Storage system 130 may be directly connected to computing device 100 or it may be otherwise operatively connected to computing device 100. For example, a first storage system 130 that includes TCR 131 may be connected to computing device 100 using a data bus as known in the art and a second storage system 130 that stores or includes data container 133 may be connected to computing device 100 over a network.

In some embodiments, input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
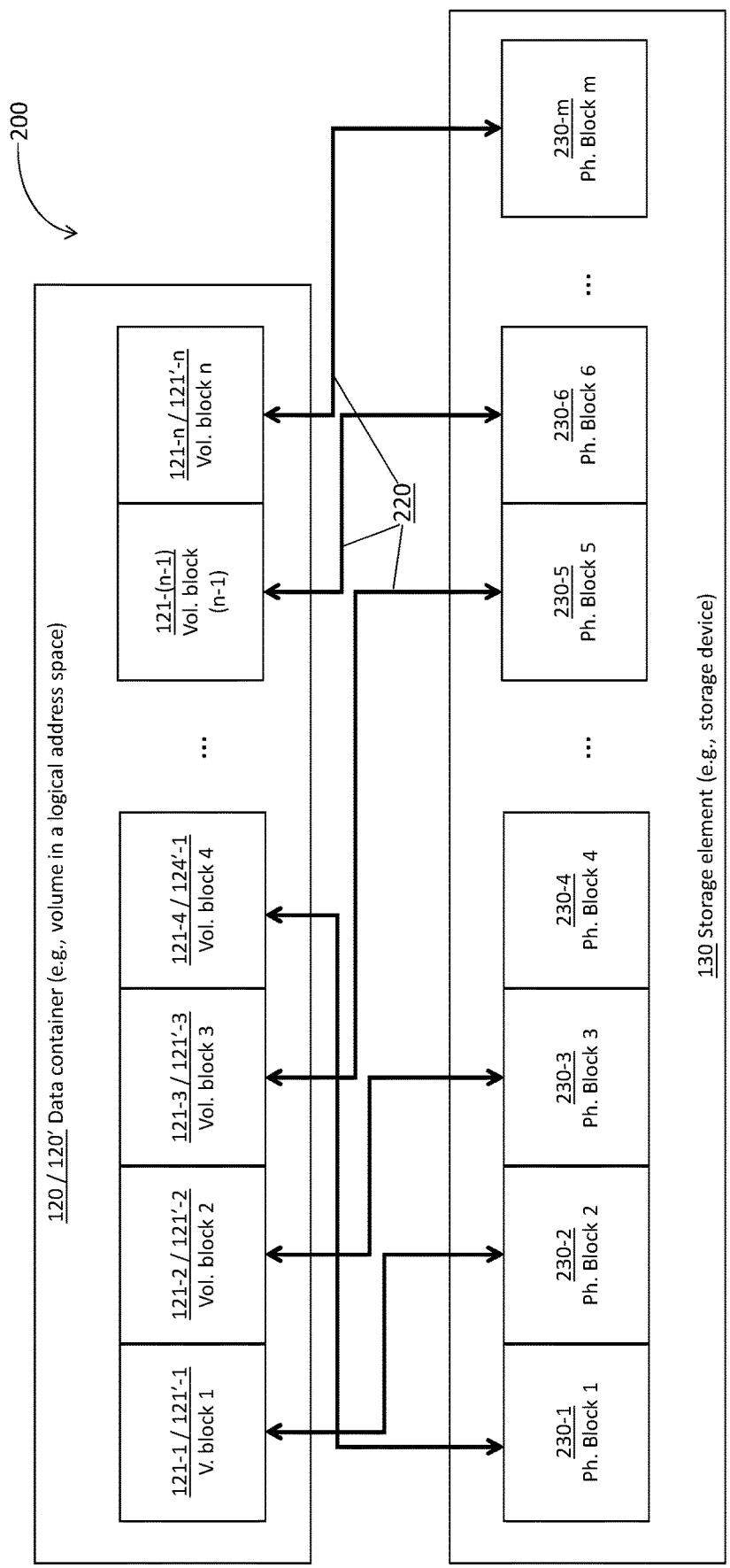
FIG. 2 is a block diagram depicting mapping of a logical address space to a physical address space, which may be included in a system for synchronization of data containers according to some embodiments of the invention.

Reference is made to FIG. 2, which is a block diagram depicting mapping of a logical address space to a physical address space, which may be included in a system for synchronization of data containers according to some embodiments of the invention. As known in the art, a data container 120 (e.g., one or more volumes, such as elements 120, 120') may include one or more subsidiary data elements, segments or blocks 121 (e.g., 121-1, 121-2, 121-3, etc. and 121'-1, 121'-2, 121'-3, etc. respectively). The subsidiary data elements, segments or blocks 121 may be associated with respective logical addresses, e.g., representing their location in a memory of a software process. For example, data container 120 may be associated with a base logical address and one or more subsidiary data elements 121 may be represented by a logical address that may include the logical address of volume 120 and one or more respective offsets of logical address with the volume.

It may be appreciated by a person skilled in the art that data container element 120 of FIG. 2 may include a representation of a data object on a logical level (e.g., as referred to by a software process) whereas data container element 133 of FIG. 1 may include a representation of the data object in a physical level (e.g., as stored on storage system or storage element 130). The same refers to subsidiary data elements or segments 121 and 134, respectively. Hence, elements 120 and 133 (and 121 and 134) may have substantially equivalent values and/or include substantially equivalent content, which may be referred herein interchangeably, according to context.

As shown in FIG. 2, in state-of-the-art or traditional systems and methods, a set of references or pointers 220 may map logical addresses, offsets, or locations of blocks 121 of data container 120 to physical addresses of blocks or storage data elements 230 (e.g., 230-1, 230-2, 230-3, etc.) on a data storage element or device.

For example, in some embodiments, pointers 220 may be values in an array, table, or list, and data elements 230 may be data blocks in a hard disk drive (HDD), a solid-state drive (SSD), and the like. In response to a read-access request of volume block 3 (e.g., 121-3), system 200 may provide the content of stored data element or block 230-5 since, as illustrated by the line connecting volume block 3 and data element or block 230-5, volume block 3 may be, or may include, a pointer 220 to physical block 230-5.

In state-of-the-art storage systems as depicted in the example of FIG. 2, data container 120 (e.g., a volume), with its pointers 220 to physical locations of stored data elements 230, may not be transportable. For example, a set of pointers 220, e.g., created on a first storage system that uses a first storage device (e.g., a first HDD), may be useless or invalid if transported to another storage system that uses a second, different storage device (e.g., a second HDD), since pointers 220 include, represent, or otherwise point to, specific addresses (or physical locations) of data elements on the first storage device, and the addresses (or physical locations) of the data elements on the second storage system may be (and normally are) different from those in the first storage system.

Some embodiments of the invention may include a transportable container representation (TCR) that may enable transporting or migrating a data container 120 (e.g., a volume, a file, etc.) from one storage system to another and/or synchronizing between different copies of data container 120, while maintaining the validity of data in, or of, the TCR and the data container, as elaborated herein. In some embodiments of the invention, a TCR may include globally valid, or unique, references to data elements in a storage system that may include one or more storage elements, storage media, and/or storage devices.

For example, references in a TCR may be valid and/or unique in a storage system that may include a set or a plurality of storage systems or storage elements, such as a set of servers and/or databases in an organization.

According to some embodiments of the invention, a TCR may be disconnected or dissociated from the data it represents. In some embodiments, instead of, or in addition to, including actual data and/or pointers to actual or physical addresses of data elements, a TCR may include one or more unique reference values (URVs) that may refer to data elements of or in a data container, and the one or more URVs may be globally valid among a plurality of storage systems.

For example, a TCR may include one or more URVs that may be associated with or mapped to physical locations and specific offsets of a data container that may be stored on a storage system (e.g., an HDD, an SSD and the like). A data container such as a volume, file, or other data object (e.g., a multimedia file) may be migrated or transported from a first storage system (e.g., a locally addressable storage device) to a second storage system (e.g., a remotely accessible storage device) by using one or more globally valid unique reference values (URVs), as explained herein.

In another example, one or more URVs may be associated with a timestamp, indicating a time at which a respective data element has been updated or changed (e.g., a time in which a write access request for writing the data element was received by embodiments of the invention). The URVs may thus be utilized to synchronize among a plurality of copies or versions of a data container (e.g., on a respective plurality of physical locations and/or storage devices) that may be stored on a respective plurality of storage systems, as explained herein.

Figure 3:
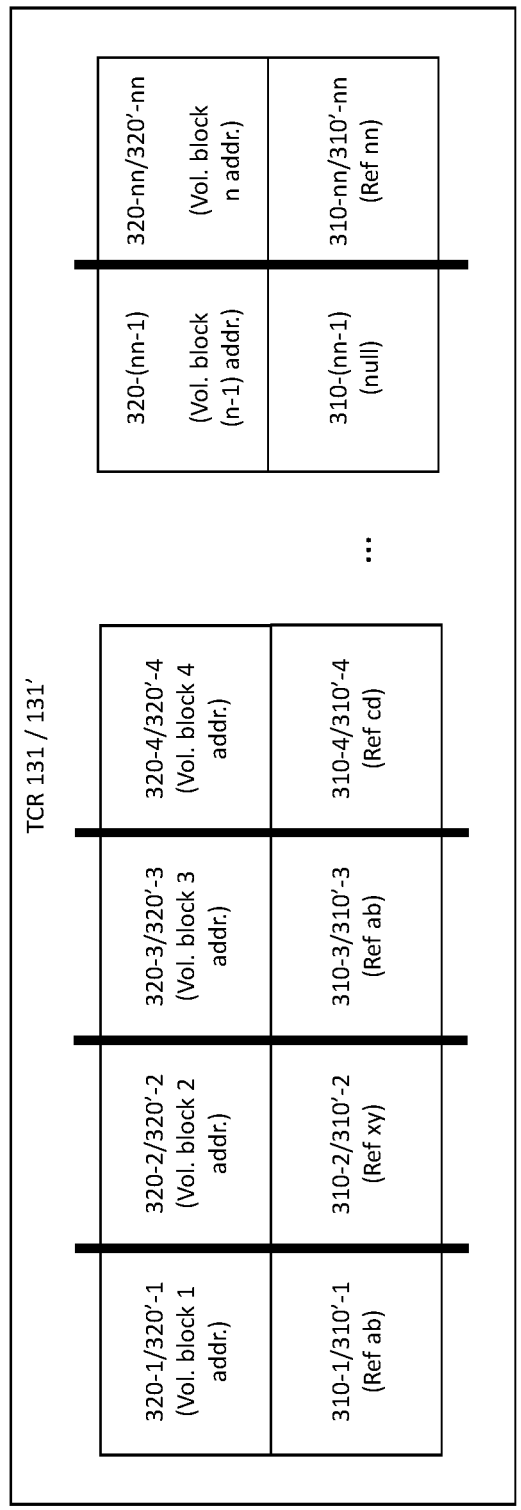
FIG. 3 is a block diagram illustrating a mapping of a logical address offset or block to a unique reference value which may be included in a system for synchronization of data containers according to some embodiments of the invention.

Reference is made to FIG. 3, which is a block diagram illustrating an example for mapping of a logical address offsets 320 (e.g., 320-1, 320-2, 320-3, etc.) to calculated URVs 310 (e.g., 320-1, 320-2, 320-3, etc.) which may be included in a system for synchronization of data containers according to some embodiments of the invention.

Logical address offsets 320 may correspond to respective data elements, segments or blocks (e.g., elements 121 of FIG. 2) within a data container (e.g., element 120 of FIG. 2).

In some embodiments, the set of one or more unique reference values (URVs) 310 may be calculated for a respective set of data elements of, or in, data container 120. Additionally, or alternatively, The URVs may be calculated based on a value or a content of respective data elements, as elaborated herein.

For example, URV element 310-1 (e.g., "Ref ab") may be calculated for a data element which corresponds to logical address 320-1 (e.g., "Volume block 1") and may include or have a value equivalent to 'ab'. URV element 310-2 (e.g., "Ref xy") may be calculated for a data element which corresponds to logical address 320-2 (e.g., "Volume block 2") and may include or have a value equivalent to 'xy', etc.

According to some embodiments of the invention, at least one URV 310 may be calculated based on the actual content of the respective stored data element.

For example, at least one URV 310 may be calculated or generated by means of a cryptographic hash or any other appropriate mechanism known in the art, that may ensure that for each data element or block in a data container (e.g., each of data elements 134 of FIG. 1), a TCR 131 may include a respective URV 310 that may be unique across a set or a plurality of storage systems (e.g., element 130 of FIG. 1). URV 310 may be unique in a sense that it may be unlikely to be found within a specific instantiation of the invention. Nevertheless, URV 310 may not be unique when compared with the universe of numbers of data stored on all existing computer systems.

As shown in FIG. 3, one or more data elements, blocks, data units, or offsets 320 in TCR 131 may point and/or be mapped to, or may be associated with, a respective URV 310.

For example, embodiments of the invention may receive (e.g., from a computing device) a data container (e.g., such as element 120 of FIG. 2) for storage. Data element 120 may, for example, include one or more subsidiary data elements or segments (e.g., such as elements 121 of FIG. 2). As explained herein, the data container 120 and/or subsidiary data elements may be represented (e.g., in a software process) by a logical address and/or a combination of a logical base address and one or more logical address offsets. Embodiments of the invention may store the received data container 120 and/or one or more subsidiary data elements or segments 121 on a storage element or system (e.g., element 130 of FIG. 1), as data container element 133 of FIG. 1 and/or one or more data elements 134 of FIG. 1, respectively. The one or more data elements or data blocks 121 may have or may include a data value or content (e.g., 'xy') and may be associated with respective one or more references 320. The one or more references may include a logical address, such as a logical address of data container 120. Alternatively, the one or more references may include a combination of a base logical address (e.g., the logical address of data container 120) and one or more logical address offsets (e.g., as depicted by element 320-2: "Vol. block 2 addr.").

TCR 131 may associate the one or more references 320 (e.g., 320-2) with one or more respective URVs 310 (e.g., element 310-2, having an exemplary value "Ref xy"). Accordingly, TCR 131 may implement a mapping between references (such as logical addresses and/or logical address offsets in data container 120) and respective URVs. Hence, when receiving a logical address offset value 320 or other address of a data element 121 in a data container 120, (e.g., a logical address offset in a volume), an embodiment may use TCR 131 to readily determine the respective URV 310 of the received data element.

In some embodiments, TCR 131 may include or may be implemented as any data structure, as known in the art that may be appropriate for mapping data at specific offsets in a data container to respective URVs.

For example, configuration data (e.g., element 132 of FIG. 1) may include a list, a linked list, a table, or any other construct that may map or associate offsets in a data container (e.g., element 133 of FIG. 1) to respective URVs that may be calculated for specific data elements 134. In other words, given a logical address offset 320 in TCR 131 (e.g., element "Vol. block 2 addr." of FIG. 3), using, for example, a table or a list, the respective URV (e.g., element "Ref xy" of FIG. 3) may be determined or known. Accordingly, embodiments of the invention may include a mapping of specific offsets in a data container 120 to URVs 310.

Figure 4:
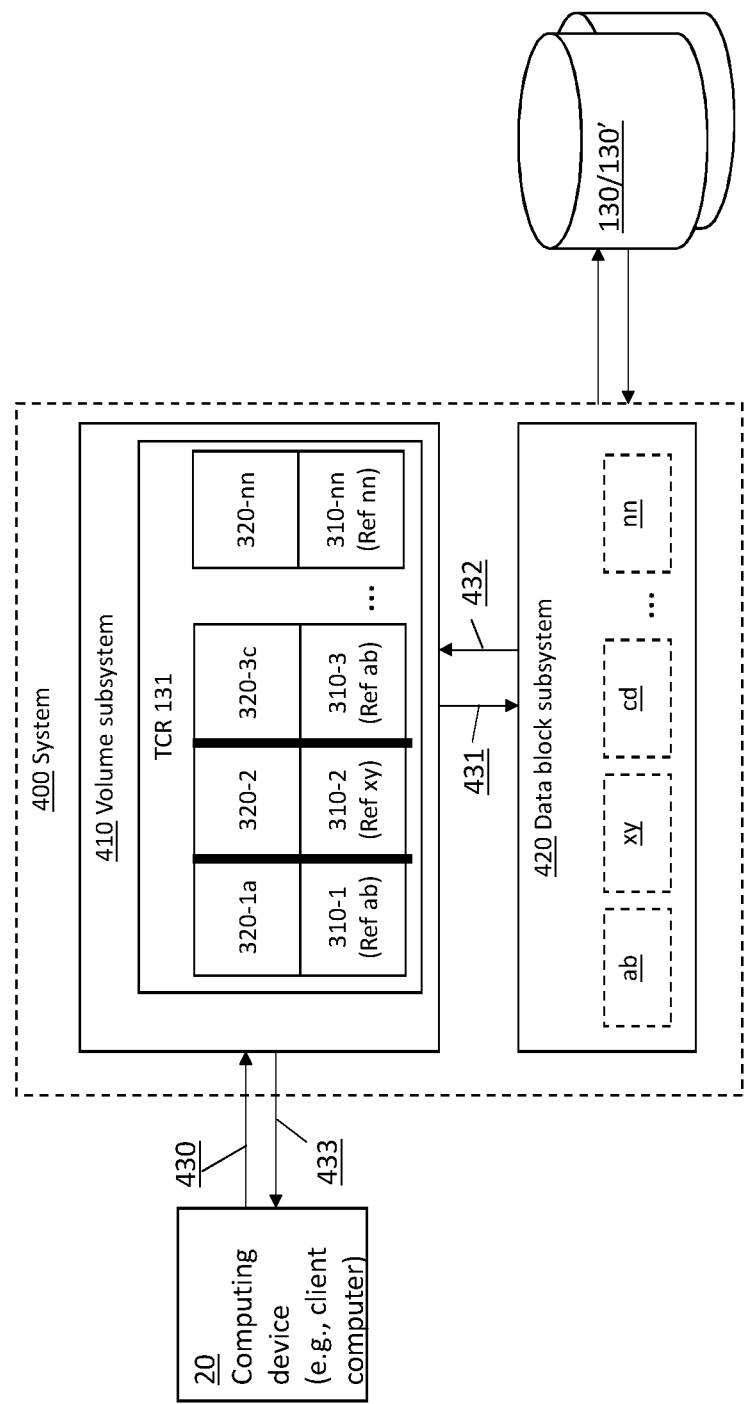
FIG. 4 is a block diagram depicting a system for synchronization of data containers according to some embodiments of the invention.

Reference is made to FIG. 4, which is a block diagram depicting a system 400 for synchronization of data containers according to some embodiments of the invention. As shown in FIG. 4, system 400 may use a transportable representation (e.g., TCR 131 of FIG. 1) of data containers.

In some embodiments, system 400 may include a volume sub-system 410 and a data block sub-system 420. Sub-systems 410 and 420 may be or may include components of computing device 100 (see, FIG. 1). For example, at least one of volume sub-system 410 and data block sub-system 420 may be or may include one or more controllers or processors (e.g., element 105 of FIG. 1), one or more memory modules (e.g., element 120 of FIG. 1) and/or one or more modules of executable code (e.g., element 125 of FIG. 1), as explained herein in relation to FIG. 1.

According to some embodiments of the invention, sub-systems 410 and 420 may be implemented on the same computing device (e.g., element 100 of FIG. 1). Alternatively, sub-systems 410 and 420 may be implemented on separate computing device entities (e.g., such as element 100 of FIG. 1) and may be communicatively interconnected by any data communication interface or protocol (e.g., via a Peripheral Component Interconnect Express (PCIE) bus, over the internet, and the like).

Volume sub-system 410 may include a mapping (e.g., in memory 124 or in storage system 130) of offsets or references in a data container 120 (e.g., a volume, a file, a data object and the like) to unique references values (URVs) as shown by offsets 320 and URVs 310, and as explained herein in relation to FIG. 3.

System 400 may be communicatively connected to one or more computing devices (e.g., element 100 of FIG. 1) such as one or more host computers and/or client computers 20 and to one or more storage systems or elements 130. System 400 may provide the one or more computing devices 20 with a view of and/or access or interface to, data elements (e.g., 134 of FIG. 1) in a data container (e.g., 133 of FIG. 1) that may be physically stored on the one or more storage systems or elements 130.

Figure 5:
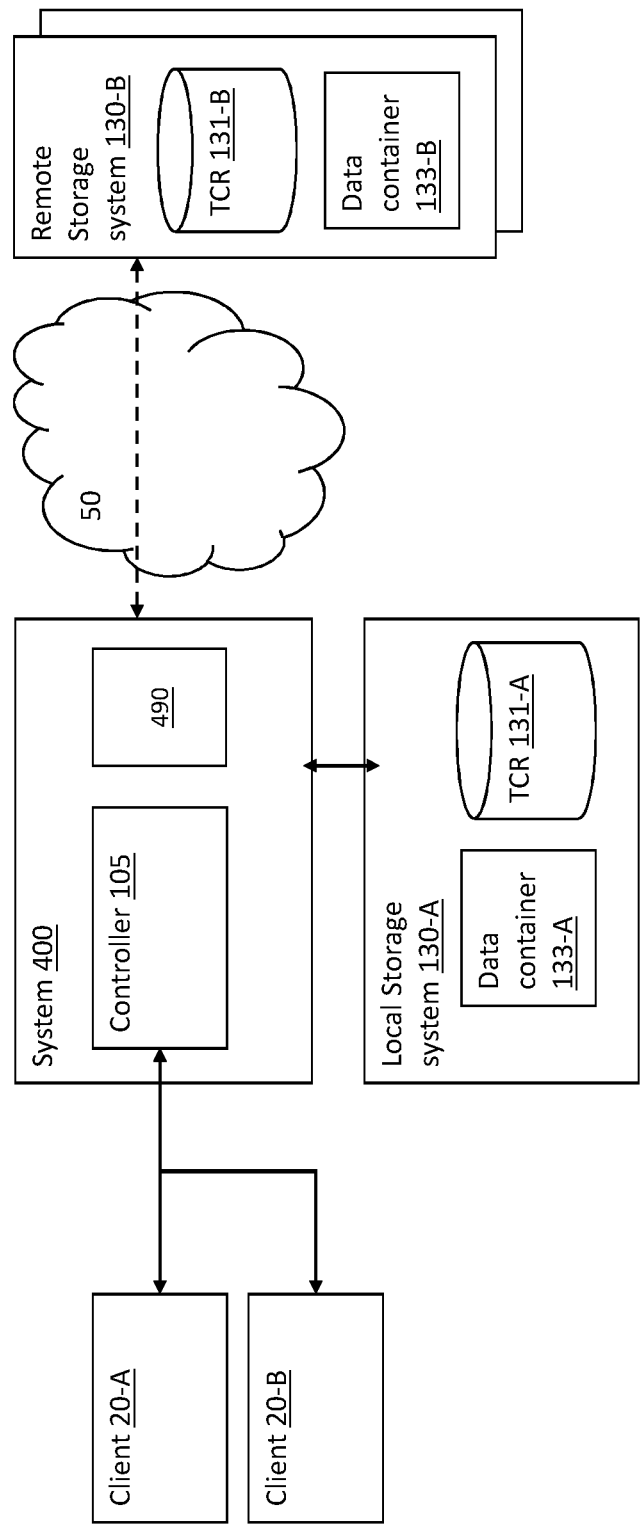
FIG. 5 is a block diagram, depicting an example of an application of a system for synchronization of data containers according to some embodiments of the invention.

As explained herein, volume subsystem 410 may include a TCR 131, that may be referred by or copied to or duplicated on one or more computing devices 20 (e.g., element 20 of FIG. 4 and/or elements 20-A, 20-B of FIG. 5). Volume sub-system 410 may provide one or more computing devices 20 with access to data elements 134 as if data container 133 was locally stored (e.g., as if data elements 134 were directly accessible to computing devices 20 via communication 430 and/or 433).

Data block sub-system 420 may access or manage the actual, physically stored data blocks (e.g., provide read-access and/or write-access to physically stored data elements 134 on one or more storage elements 130).

According to some embodiments of the invention, data block sub-system 420 may include a mapping between URVs 310 (e.g., "Ref ab") and actual physical addresses or locations of data elements 134 (e.g., "ab"). For example, at least one storage system or element 130 may be a content addressable storage (CAS) device, and data block sub-system 420 may store and/or access one or more data elements 134 on the at least one storage element 130, using the respective URVs as a content identifier, as known in the art.

Accordingly, given a URV of a data element, data block sub-system 420 may determine the physical address or location of the respective data element 134 on storage system or element 130 (e.g., on a hard drive or other storage device or system). Data block sub-system 420 may subsequently use the determined address or location to retrieve the data element and/or a value thereof, modify the data element, delete and/or overwrite the data element or data block.

As shown by arrow 430, to retrieve an element or block of data, system 400 may be queried by computing device 20 with a reference to a required data element or block. As shown by arrow 433, system 400 may respond with an acknowledgment. For example, arrow 430 may represent a read access request including one or more references 320 to a data element or block, and arrow 433 may represent as output a content or data value stored in a respective physical location based on the one or more input references.

Additionally, or alternatively, to read a data element or block (e.g., one of data elements 134) a user and/or an application may use computing device 20 to issue a read request 430 that may include one or more references to 320, or logical address offset in, a data container (e.g., a volume, a file, etc.), as input to system 400. Volume sub-system 410 may convert one or more input reference 320 to a URV 310 in a query that may be issued to data block subsystem 420 (e.g., as shown by arrow 431). Additionally, or alternatively, volume sub-system 410 may include input reference 320 in query 431. Data block sub-system 420 may return (as shown by arrow 432) the content or value of the actual requested data. The actual requested data may be provided to querying computing device 20 as shown by arrow 433.

According to some embodiments of the invention, system 400 may be adapted to write, delete, and/or modify one or more data elements 134 in storage device 130.

For example, to write or modify data in one of data elements 134, an application or user may use computing device 20 to provide, as input to system 400, one or more references to blocks or offsets in a data container, and respective data to be stored at the location of the referenced blocks or offsets. The input of one or more references may be used for determining respective one or more URVs 310, as described herein. Data block sub-system 420 may use the one or more URVs 310 to determine a physical location or address, as described herein, and the content provided as input may be stored in the determined physical location.

In another example, an application or user may use computing device 20 to provide, as input to system 400, one or more references to blocks or offsets 121 in a data container 120, and one or more respective commands (e.g., delete commands). Volume subsystem 420 may use the one or more input references 121 to determine one or more respective URVs 310 as described herein. Data block sub-system 420 may use the one or more URVs 310 to determine a physical location or address as described herein, and the one or more input commands provided as input (e.g., deletion or any other manipulation of data) may be applied or performed on the content in the determined respective physical address or location.

According to some embodiments of the invention, a single data block subsystem 420 may be used in order to access more than one data container 133. For example, data block subsystem 420 may use URVs that may be unique in a system that may include a plurality of storage systems 130 and may accordingly store a respective plurality of data containers 133 (e.g., different copies, versions or instances of the same data container 133). Data block subsystem 420 may locate, find or access data elements or blocks 134 of any number of data containers 133 that may be stored on any number of storage systems 130. Additionally, or alternatively, data block sub-system 420 may access data elements or blocks 134 in a plurality of data containers 130 (e.g., block volumes, data objects, files, etc.) using the same or a single data block sub-system 420.

According to some embodiments of the invention, at least one TCR metadata structure 131 may include a timestamp field, which may be utilized for tracking updates or changes that may have been made to stored data elements over time. Metadata relating to such updates may, for example, be aggregated in a TCR metadata table and/or may be stored or maintained in a database (e.g., element 131 of FIG. 1). The TCR metadata table 131 may include one or more entries as depicted in the example of Table 1, below:

TABLE 1

| Timestamp | Data container | Offset | URV |
|---|---|---|---|
| 300 | Vol 1 | 0x100 | Ref ab |
| 301 | Vol 2 | 0x245 | Ref ab |
| 301 | Vol 1 | 0x099 | Ref ca |
| 301 | Vol 3 | 0x340 | Ref aa |
| 302 | Vol 2 | 0x200 | Ref bd |
| ... | ... | ... | ... |

As shown in the example of Table 1, TCR metadata table 131 may include one or more entries, corresponding to respective one or more data elements 134 or versions or copies of data elements that may have been written, stored, updated or changed on a storage device or system 130. In some embodiments, one or more (e.g., each) of the TCR entries may include at least one of;

a logical address (e.g., elements 320 of FIG. 3) of the stored data element 134;

a mapping or association of the logical address to a respective URV (e.g., elements 310 of FIG. 3); and a timestamp, indicating a time at which a content of the stored data element 134 has been stored, written and/or changed.

In the example of Table 1, the logical addresses of stored data elements 134 are represented as a combination of a name or a base logical address of a data container 120 (corresponding to stored data container 133) and offsets to logical addresses of data elements 121 (corresponding to stored data elements 134). For example, the base logical addresses or names may correspond to volumes (e.g., Vol1, Vol2 and Vol3) and the logical address offsets may correspond to offsets of written or changed data elements 121 (e.g., 0x100, 0x200) within the data containers (e.g., volumes).

As shown in the example of Table 1, one or more (e.g., each) entry of TCR metadata table 131 may include a time identifier or timestamp associated with the occurrence of a change or update of a content of a data element 134. For example, the timestamp may be a value of a monotonically increasing counter (e.g., a coordinated universal time (UTC) counter), indicating a time of a change in the value of a stored data element 134. Additionally, or alternatively, the timestamp may indicate a time at which a write access request has been received by an embodiment of the invention, to store, write or update a value of a data element on storage element or system 130.

According to some embodiments of the invention, when a content of a data element 134 is changed or updated (e.g., by overwriting a value or content of at least one data element 134 of a data container 133), the corresponding URV may be recalculated (e.g., by performing a secure hash function on the changed content). A new entry may be introduced to the TCR metadata table. The new entry may include the name of the data container, the relative offset (e.g., a logical address offset) to the changed data element 134, the newly calculated URV and a timestamp corresponding to the time of change (e.g., a UTC timestamp) of the reference value (e.g., a time of receiving a request for a write access operation from client 20).

According to some embodiments, each storage system or storage device 130 may be assigned (e.g., by controller 105 of FIG. 1) a unique identifier. The identifier may herein be referred to as a unique storage system identifier (SSI).

According to some embodiments of the invention, the TCR metadata table 131 may include at least one entry that may include a unique SSI identifier, to associate one or more (e.g., all) URVs with a specific storage system or element 130 according to the respective data element's location of storage. In other words, the SSI identifier may be adapted to identify a specific storage element or system 130 in which a corresponding data element has been stored.

In some embodiments, the SSI may be included as an independent field within at least one entry of the TCR metadata table 131, as depicted in the example of table 2, below:

TABLE 2

| Timestamp | Data container | Offset | Reference | SSI |
|---|---|---|---|---|
| 300 | Vol 1 | 0x100 | Ref ab | SSI1 |
| 301 | Vol 2 | 0x245 | Ref ab | SSI1 |
| 301 | Vol 1 | 0x099 | Ref ca | SSI1 |
| 301 | Vol 3 | 0x340 | Ref aa | SSI2 |
| 302 | Vol 2 | 0x200 | Ref bd | SSI2 |
| ... | ... | ... | ... | |

According to some embodiments of the invention, at least one controller or processor (e.g., element 105 of FIG. 1) may synchronize between different copies or versions of a data container 133 according to the URVs and respective timestamps. In some embodiments, the synchronization may be prompted by an event (e.g., a synchronization request made by a user and/or an application, a read-access request received from a client computer 20, and the like). Alternatively, or additionally, the synchronization may be prompted by and/or during an offline process (e.g., 'lazily', as commonly referred to in the art).

In some embodiments, at least one controller or processor 105 may receive (e.g., from computing device 20, from an internal software process and the like) one or more first data elements 121 of a first data container 120 and one or more second data elements 121 (herein enumerated 121', indicating a copy or a version of 121) of at least one second data container 120 (herein enumerated 120', indicating a copy or a version of 120).

Controller 105 may compute one or more first URVs 310 for the respective one or more first data elements 121 and compute one or more second URVs 310 for the respective one or more second data elements 121', as elaborated herein in relation to FIG. 3. For example, data container 120 may include one or more data elements or segments 121, and controller 105 may calculate a URV per each data segment 121.

Controller 105 may store the one or more first data elements 121' on a first storage element or system 130 and store the one or more second data elements 121' on a second storage element or system 130 (herein enumerated 130', indicating an instantiation of a storage element or system that may be or may not be the same as storage element 130).

Additionally, or alternatively, in some embodiments, controller or processor 105 may receive at least one data object for storage (e.g., a data element 121 and/or a data container 120 including on or more data elements or segments 121). Controller or processor 105 may compute at least one URVs based on a content of the at least one data element 121, as elaborated herein and may store copies of the at least one data element on a plurality of CAS storage systems elements or devices 130 according to the URV (e.g., using the URV as a data identifier, as elaborated herein).

It may be appreciated, by those skilled in the art, that at least one stored copy (e.g., element 133 of FIG. 1) of a data container (e.g., 120') and/or associated stored copies or versions (e.g., element 134 of FIG. 1) of data elements or segments (e.g., 121') may be changed, overridden or updated over time, creating a difference or divergence between the data stored on first storage element or system 130 and the data stored on second storage element or system 130'. Therefore, a user or a software process (e.g., executed by computing device 20) may require synchronizing between the two copies.

Embodiments of the present invention may compare between contents of one or more TCR metadata entries to determine a condition in which the content of a stored first data element (or a version of stored data element 134) and the content of at least one second stored data element 134' (or a version of stored data element 134') have diverged over time. Embodiments of the invention may subsequently retrieve the content of one of the first stored version 134 and the at least one second stored version 134' (and/or a reference thereto) based on the comparison, as elaborated herein.

Controller 105 may compare between a first URV 310 of the one or more first URVs (e.g., corresponding to the one or more first data elements 121) and a second URV of the one or more second URVs (e.g., corresponding to the one or more first data elements 121') to identify, for example, data elements that may have diverged or changed content (e.g., data that may have diverged over time).

Controller 105 may consequently synchronize between content of the first data container 120 and content of the at least one second data container 120' based on the comparison: If the content of the compared URVs is equivalent, controller 105 may determine that the respective data elements (e.g., 121 and 121') may have an equivalent content or value. Complementarily, if the content of the compared URVs is not equivalent, controller 105 may determine that the respective data elements (e.g., 121 and 121') may have a non-equivalent content or value and may thus require synchronization, as elaborated herein.

As elaborated herein, the term 'synchronization' may refer to a process that may include utilizing an identification of at least one difference between URVs to modify a content of at least one data element (e.g. a 'target' data element) to be equivalent (e.g., equal in content) to that of another data element (e.g. a 'source' data element).

According to some embodiments, controller 105 may synchronize between (a) a content of one or more first data elements 121 (e.g., of a first data container 120), corresponding to one or more first stored data elements 134 on a first storage element 130 and (b) a content of one or more second data elements 121' (e.g., of a second data container 120'), corresponding to one or more second stored data elements 134' on one or more second storage elements 130'.

Controller 105 may copy a content of a first diverged or changed stored data element 134 (or a first version of a stored data element) from the first storage element or system 130 (e.g., a first CAS storage element or device) to the at least one second storage element or system 130' (e.g., a second CAS storage element or device), and may thus override or replace the content of the one or more second stored data element 134' (or a second version of the stored data element) with content of the one or more respective first stored data element 134.

Additionally, or alternatively, controller 105 may copy a first TCR table entry pertaining to the diverged data element (e.g., 134), and update TCR metadata table 131 to include a second TCR table entry pertaining to the writing or overriding of the second stored data element 134'.

Additionally, or alternatively, embodiments of the invention may maintain or store a first TCR metadata element or structure 131 at the first storage element or system 130 and one or more second TCR metadata structures or elements 131' at respective one or more second storage elements or systems 130'. Controller 105 may compare between content of one or more metadata entries of the first TCR metadata structure and content of at least one second TCR metadata structure to determine a condition in which the content of the first version and content of at least one second version have diverged over time. For example, controller 105 may identify a first TCR metadata entry and a second TCR metadata entry that comprise an equivalent logical address but a different URV. Controller 105 may synchronize a content of at least one TCR metadata structure based on the comparison. For example, controller 105 may copy a first TCR table entry pertaining to the diverged data element (e.g., 134) from the first storage element (e.g., 130) to the at least one second storage element (e.g., 130'). Alternatively, or additionally, Controller 105 may copy a content of the identified first TCR metadata entry from the first TCR metadata structure to the second TCR metadata structure, to synchronize the contents of the first TCR metadata structure and the second TCR metadata structure.

For example, a user and/or an application of computing device 20 may identify two data containers 133 (e.g. volumes, files, etc.) that may contain one or more data elements 134 that are copies or versions of the same original data and that may have diverged over time (e.g., having different URVs). For example, the data container 133 may be a table in a relational database and the one or more data elements 134 may be entries in the table, where at least one entry has been modified on one copy (e.g., by a write access of a client computing device 20 on one copy or version of container 133) but not in another copy, at a specific point in time.

In some embodiments, the user and/or application may determine that a first copy is a source copy and that at least one second copy is a target copy. In other words, in order to synchronize between the copies, the at least one target copy will need to be synchronized (e.g., have its contents changed) so that it will appear as and/or contain the same information as that of the source copy.

In another example, a user and/or an application of computing device 20 may utilize a timestamp to identify a previous point in time in which a source copy included a previous version of at least one portion (e.g., a block) or data element 134 of a data container 133 (e.g., a volume). The one or more target copies may be synchronized to match the content of the source copy at (e.g., just before or just after) the identified point in time. Controller 105 may compare between a first timestamp of a first TCR table entry (e.g., pertaining to a first stored data element 134) and a second timestamp of a second TCR table entry (e.g., pertaining to a second stored data element 134'), to determine a divergence time in which content of the first data element and content of the second data element have diverged. Controller 105 may synchronize between content of the first data container and content of the at least one second data container based on the divergence time.

For example, in some embodiments, if a timestamp corresponding to the first stored data element 134 corresponds to a timing that precedes a timestamp corresponding to the second stored data element 134' then controller 105 may ignore the difference of data content and may not synchronize between the two data elements (e.g., 134, 134'). In a complementary manner, in some embodiments, if a timestamp corresponding to the first stored data element 134 corresponds to a timing that is delayed (e.g., representing an updated content) in relation to a timestamp corresponding to the second stored data element 134' then controller 105 may synchronize second data element 134' to be equivalent to data element 134, as explained herein.

According to some embodiments of the invention, controller 105 may be configured to manage storage of data elements on one or more storage devices by responding to one or more data access request with a content of one, selected stored data element 134.

For example, controller 105 may receive (e.g., from client 20) a data access request (e.g., element 430 of FIG. 4, such as a read access request) for accessing (e.g., reading) one or more stored data elements 134. The data access request may include at least one logical address (e.g., an element 320 of FIG. 4). Volume subsystem 410 may identify a first TCR table 131 entry corresponding to a first stored data element 134 (e.g., a copy or a version a data element 121) and a second TCR table 131 entry corresponding to a second stored data element 134 (e.g., herein enumerated 134' that may be another copy or a version of data element 121) based on logical address 320 (e.g., a logical address of a data element 121 corresponding to both stored data elements 134, 134'). Volume subsystem 410 may identify, at the first TCR table 131 entry, a first timestamp, corresponding to storage of data element 121 on a first storage element or system 130 (e.g., element 134). Volume subsystem 410 may identify, at the second TCR table 131 entry, a second timestamp, corresponding to storage of data element 121 on a second storage element or system 130' (e.g., element 134'). Volume subsystem 410 may compare between the first timestamp and second timestamp and may select one of stored data elements 134 (e.g., on first storage element or system 130) and 134' (e.g., on second storage element or system 130') according to the comparison.

For example, volume subsystem 410 may be configured to read from a storage system corresponding to the latest of the first timestamp and second timestamp, so as to retrieve the latest, up-to-date data. Volume subsystem 410 may thus select a TCR table entry based on the comparison (e.g., corresponding to the latest, up-to-date stored copy or version of data element 121). Volume subsystem 410 may subsequently command data block subsystem 420 to address the selected storage system or element 130 so as to retrieve the content of the selected stored version or copy (e.g., 134 or 134') of required data element 121 from the respective storage system or element 130. Controller 105 may thus respond 433 to the access request (read-access request) of computing device 20 based on the selected TCR table entry (e.g., by providing the content of the corresponding stored data element (e.g. 134 or 134')).

As elaborated herein, controller 105 may be configured to respond 433 to a data access request 430 (e.g., a read access request) with a content of a data element corresponding to the selected TCR table entry. Additionally, or alternatively, controller 105 may respond to the data access request with a pointer or reference to the requested data element 134. For example, response 433 may include an SSI of the selected TCR table entry and/or a URV 310 of a data element 134 corresponding to the selected TCR table 131 entry.

Additionally, or alternatively, a user and/or an application of computing device 20 may utilize one or more timestamps to obtain a copy of the stored data container that may include a set of up-to-date versions of data elements 134. For example, controller 105 may be configured to synchronize between content of one or more (e.g., all) data elements 134 of a first data container 133 (e.g., stored on a first storage system or element 130) and content of one or more (e.g., a plurality or all) data elements 134' of at least one second data container 133' (e.g., stored on at least one second storage system or element 130'). Controller 105 may, for example, pass or iterate through each data element 134 of data container 133, compare between a first timestamp corresponding to data element 134 and a second timestamp corresponding to respective data element 134' and bring or cause the content of the at least one second data container 133' to include data corresponding to a later timestamp between the first timestamp and the second timestamp.

Additionally, or alternatively, a user and/or an application of computing device 20 may utilize one or more timestamps to obtain a copy of the stored data container that may include a version of data elements 134 that correspond to a specific point in time (e.g., between a first time and a second, later time). For example, controller 105 may receive (e.g., from a client computing device 20) a snapshot timestamp (e.g., a representation of a point in time, for example in UTC format), and may synchronize between content of a first data container 133 and content of at least one second data container 133' based on the snapshot timestamp, to bring or cause the content of the at least one second data container to include snapshot data corresponding to the snapshot timestamp. For example, controller 105 may pass or iterate through each data element 134 of data container 133 and compare between a first timestamp corresponding to data element 134, a second timestamp corresponding to respective data element 134' and the snapshot timestamp. Controller 105 may consequently synchronize the content of at least one second data container 133' or bring or cause the content of the at least one second data container 133' to include data that corresponding to the latest timestamp before the snapshot timestamp.

Reference is now made to Table 3 (below), which depicts an example of two copies or versions of a data container 133, and to FIG. 5, which is a block diagram, depicting an example of an application of a system 400 for synchronization of data containers 133 (e.g., 133-A, 133-B) according to some embodiments of the invention.

System 400 may be utilized to manage data storage one a plurality of storage elements or systems 130, as elaborated herein. It is noted that system 400 of FIG. 5 may be equivalent to that of FIG. 4 as elaborated herein and that modules of system 400 have been omitted from FIG. 5 for the purpose of clarity.

As shown in the non-limiting example of FIG. 5, system 400 may be connected to one or more storage elements or storage systems via a network 50, which may include a private operational network, the Internet, one or more telephony networks, one or more network segments including local area networks (LAN) and wide area networks (WAN), one or more wireless networks, or a combination thereof.

In some embodiments, system 400 may include a system server 490 constructed in accordance with one or more embodiments of the invention. In some embodiments, system server 490 may be a stand-alone computer system. In other embodiments, system server 490 may include a decentralized network of operatively connected computing devices, which communicate over network 50. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to network 50.

System server 490 may be any suitable computing device and/or data processing apparatus capable of communicating with computing devices (e.g., elements 20-A, 20-B, 130-A, 130-B), other remote devices or computing networks, receiving, transmitting and storing electronic information and processing requests as further described herein. System server 490 is therefore intended to represent various forms of digital computers, such as laptops, desktops, workstations, personal digital assistants, servers, blade servers, edger servers, mainframes, and other appropriate computers and/or networked or cloud-based computing systems capable of employing the systems and methods described herein.

As elaborated herein, system 400 may receive (e.g., from a client computing device 20 such as 20-A), at a first timing, a first version of a data element 121 associated with a logical address 320. System 400 may compute a first URV 310 based on a content of the first version of data element 121 (e.g., as a hash function of the content of the received first version) and may store the first version 121 of data element 121 (e.g., as a first stored element 134) on a first storage element 130. System 400 may receive (e.g., from a client computing device 20 such as 20-B), at a second timing, at least one second version of the data element 121 associated with the logical address. System 400 may compute at least one second URV 310 based on a content of the at least one second version and may store the at least one second version (e.g., as a second stored element 134') on at least one second, respective storage element or system 130'.

It may be noted that at the time of reception, the first received version of data element 121 and the second received version of data elements 121 may have equivalent contents and may be regarded as copies of the same data element. Additionally, or alternatively, the first stored version and at least one second stored version may diverge over time (e.g., by an override action of data updated by one or more client computing devices 20 (e.g., 20-A, 20-B)).

According to some embodiments, system 400 may receive a data access request including the logical address. As elaborated herein in relation to FIG. 4, system 400 may select between the first stored version 134 and the at least one second stored version 134' based on at least one of: the first URV, the at least one second URV, the first timing and the second timing. For example, system 400 may compare between a first URV associated with a first stored version of a data element and a second URV associated with a second stored version of a data element to identify a divergence in the content of the respective stored copies, and may select one of the copies according to a corresponding (e.g., a latest) timestamp.

In some embodiments, system 400 may subsequently respond to the received data access request based on the selected version, by providing or retrieving a content of the selected stored data element version 134 (or a reference or pointer thereto) and may thus manage storage of data on one or more (e.g., a plurality) of storage elements or systems 130.

Controller 105 may receive (e.g., from a client computer 20 (e.g., 20-A, 20-B)) a reference (e.g., a logical address) to at least one first copy of a data container 133-A (e.g., a file, a data object, etc.) that may be stored on a first storage system (e.g., 130-A) and a reference (e.g., a logical address) to at least one second copy of the data container 133-B that may be stored on a second storage system (e.g., 130-B).

In a first exemplary scenario, the two copies (133-A and 133-B) may have a common origin, and thus embodiments of the system may synchronize between two versions of the data container 133 (e.g., a volume, a file, etc.) that may have diverged over time. In a second exemplary scenario, at least one first data container (e.g. 133-A) and the at least one second data container (e.g. 133-B) may not have originated from a common origin or ancestor data container 133 but may nevertheless be synchronized by the same method as described herein.

According to some embodiments of the invention, as depicted in FIG. 5, embodiments may include one or more TCR metadata structures or elements 131 (e.g., 131-A, 131-B) that may be local to respective one or more storage systems or elements 130 (e.g., 130-A, 130-B). For example, TCR metadata structure 131-B may be associated with or included in remote storage system 130-B and may include metadata entries pertaining to one or more data containers that may be stored at remote storage system 130-B. Therefore, TCR metadata structure 131-B may be referred to as local to remote storage system 130-B. As elaborated herein, during a process of synchronization between content of one or more data elements (e.g., between a first copy or version of a data element stored on a first storage system 130 and a second copy or version of a data element stored on a second storage system 130), one or more TCR metadata structures entries may be copied from a first metadata structure 131 (e.g., 131-A) to a second metadata structure 131 (e.g., 131-B).

Additionally, or alternatively, in some embodiments, at least one TCR metadata structure may be globally stored on a computing device that may be associated a plurality of storage systems or elements 130. The term globally may be used herein to refer to a TCR metadata structure that may relate to a plurality of storage systems and/or elements 130. For example, TCR metadata structure 131-B may be associated with a plurality of storage systems or elements 130. In this embodiment, at least one metadata entry of the globally stored TCR metadata structure 131 may include at least one identifier (e.g., an SSI identifier) representing a respective storage element, so as to associate between a specific logical address of a stored data element 134, a respective URV 310 and a respective storage element.

According to some embodiments of the invention, controller 105 may receive (e.g., from a user, from an application, etc.) at least one of: an indication of a first copy (e.g., 133-A) as being the source copy, an indication of a second copy (e.g., 133-B) as being the target copy, and a time identifier or timestamp (e.g., TS-A3), indicating the point in time in which the copies have diverged (e.g., representing the state of the source copy to which the target copy needs to be synchronized).

Alternatively, or additionally, controller 105 may be configured to identify at least one difference between the source copy and target copy (e.g., 133-A, 133-B). For example, controller 105 may use a time identifier or timestamp in each TCR (e.g., 131-A, 131-B) associated with the respective copies to find all the changes that have occurred since the contents of the volumes have diverged.

In yet another embodiment, controller 105 may disregard the timestamps, and identify all the changes between the two copies by comparing the URVs of the two TCRs.

TABLE 3

| TCR 131-A (Container 133-A—Source) | | | | | | | | | |
|---|---|---|---|---|---|---|---|---|---|
| URV | Ref aa | Ref ac | Ref bb | Null | Ref cb | Null | Ref ca | ... Null | Ref ae |
| Offset | Offset 0 | Offset 1 | Offset 2 | Offset 3 | Offset 4 | Offset 5 | Offset 6 | Offset [N-2] | Offset [N-1] |

TABLE 3-continued

| Timestamp | TS-A0 | TS-A1 | TS-A2 | TS-A3 | TS-A4 | TS-A5 | TS-A6 | ... | TS-A [N-2] | TS-A [N-1] |
|---|---|---|---|---|---|---|---|---|---|---|
| TCR 131-B (Container 133-B—Target) | | | | | | | | | | |
| URV | Ref aa | Ref ae | Ref bb | Ref bb | Ref cb | Null | Null | ... | Null | Ref ae |
| Offset | Offset 0 | Offset 1 | Offset 2 | Offset 3 | Offset 4 | Offset 5 | Offset 6 | | Offset [N-2] | Offset [N-1] |
| Timestamp | TS-B0 | TS-B1 | TS-B2 | TS-B3 | TS-B4 | TS-B5 | TS-B6 | | TS-B [N-2] | TS-B [N-1] |

Table 3 depicts an example of two copies of data containers (e.g. volumes) that have diverged over time. For example, as shown in table 3, the URV value for Offset 1 between the two tables is different (e.g., Ref ac and Ref ae respectively), indicating that the two copies of the volume may have diverged at the earliest time between timestamp TS-A1 and TS-B1.

In some embodiments, each of the copies may include one or more (e.g., N) data elements 134 (e.g., data blocks, segments and the like). Synchronization of the target copy (e.g. container 133-B) may be performed to the latest point in time of the source copy (e.g. container 133-A), or to a predefined point in time (e.g. Timestamp TS-A4) of the content of the source copy.

After identifying at least one difference between the TCR (e.g., 131-A) associated with the data container source copy (e.g., 133-A) and the TCR (e.g., 131-B) associated with the data container target copy (e.g., 133-B) as explained herein, target TCR (e.g., 131-B) may be updated to match the TCR of the source copy (e.g., 131-A).

To achieve the required synchronization, in some embodiments, for each identified difference between the TCRs 131 of the source copy (e.g., 133-A) and the target copy (e.g., 133-B), controller 105 may copy a respective URV from the TCR (e.g., 131-A) of the source copy (e.g., 133-A) to the TCR (e.g., 131-B) of the target copy (e.g., 133-B). In some embodiments, controller 105 may also copy a respective data element from the respective source copy (e.g., 133-A) of the data container to replace a respective data element of the target copy (e.g., 133-B).

In some embodiments in which synchronization to a predefined point in time may be required, controller 105 may only copy URVs and respective data elements from the TCR (e.g., 131-A) of the source copy (e.g., 133-A) to the TCR (e.g., 131-B) of the target copy (e.g., 133-B) that correspond to the content of the source copy (e.g., 133-A) at the predefined point in time.

In some embodiments, the size of the TCR and respective data elements that must be transmitted from the source copy to the target copy may be minimized by establishing the point of divergence. For example, a TCR of a first storage system may only include records of changes made in the first storage system since the point of divergence, and a TCR representation of a second storage system may only include records of changes made in the second storage system since the point of divergence. Comparing the two TCR representations may indicate the data that needs to be added, modified and/or removed as part of the synchronization process.

Figure 6:
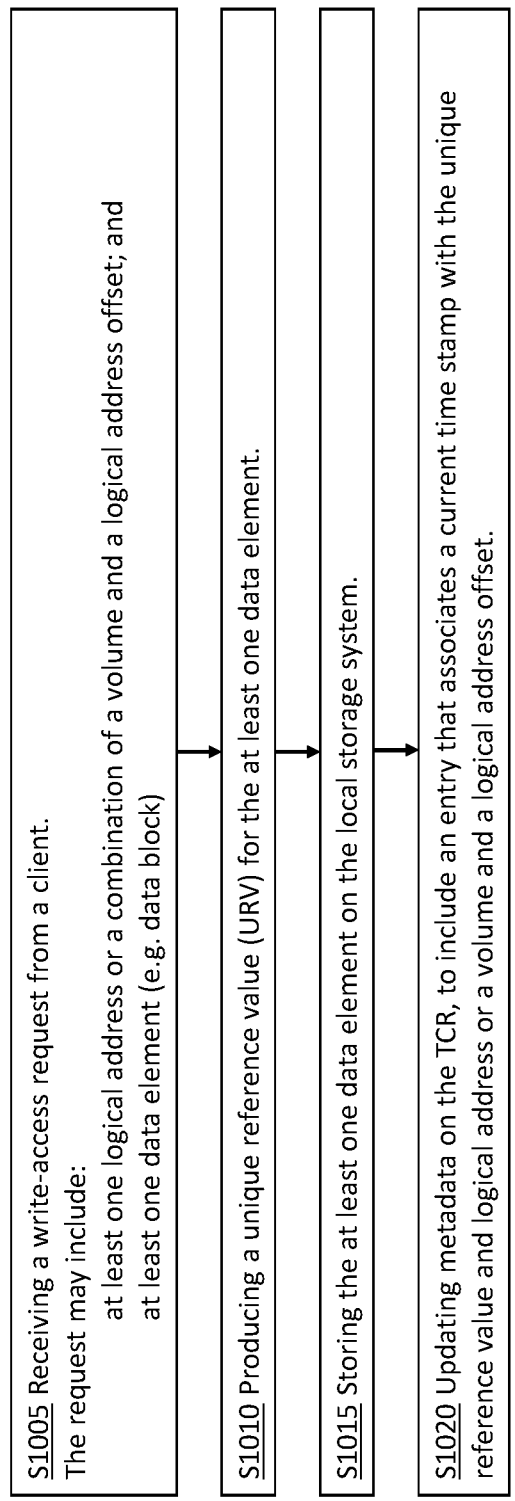
FIG. 6 is a flow diagram depicting handling of a write-access operation by a system for synchronization of data containers according to some embodiments of the invention.

Reference is now made to FIG. 6, which is a flow diagram depicting handling of a write-access operation by a system (e.g., system 400 of FIG. 5) for synchronization of data containers (e.g., element 133 of FIG. 1) according to some embodiments of the invention.

As shown in step S1005, in some embodiments, a controller or processor (e.g., element 105 of FIG. 1) may receive a write-access request from a client 20 (e.g., 20-A, 20-B of FIG. 5). The write-access request may include at least one logical address (e.g., a logical address of a data container 133 such as a logical address of a volume) or a combination of a logical address (e.g., of the volume) and a logical address offset (e.g., of a data element 134). The write-access request may further include at least one data element (e.g. a data block or content to be written).

As shown in step S1010, in some embodiments, controller 105 may produce a URV for the at least one data block. For example, controller 105 may compute the URV by applying a hash function on the content of the at least one data block.

As shown in step S1015, in some embodiments, controller 105 may store the at least one data block or data element 134 on a local storage system or storage device (e.g. element 130-A of FIG. 5).

As shown in step S1020, in some embodiments, controller 105 may update metadata (e.g. as in Table 1) on a TCR (e.g., element 131-A of FIG. 5), to include an entry that may associate a current time stamp (e.g., a timestamp of receiving the write-access request and/or a timestamp of the storage of data element 134 on storage device 130) with the URV and with the logical address (e.g., with the combined address of the volume address and the logical address offset).

Figure 7:
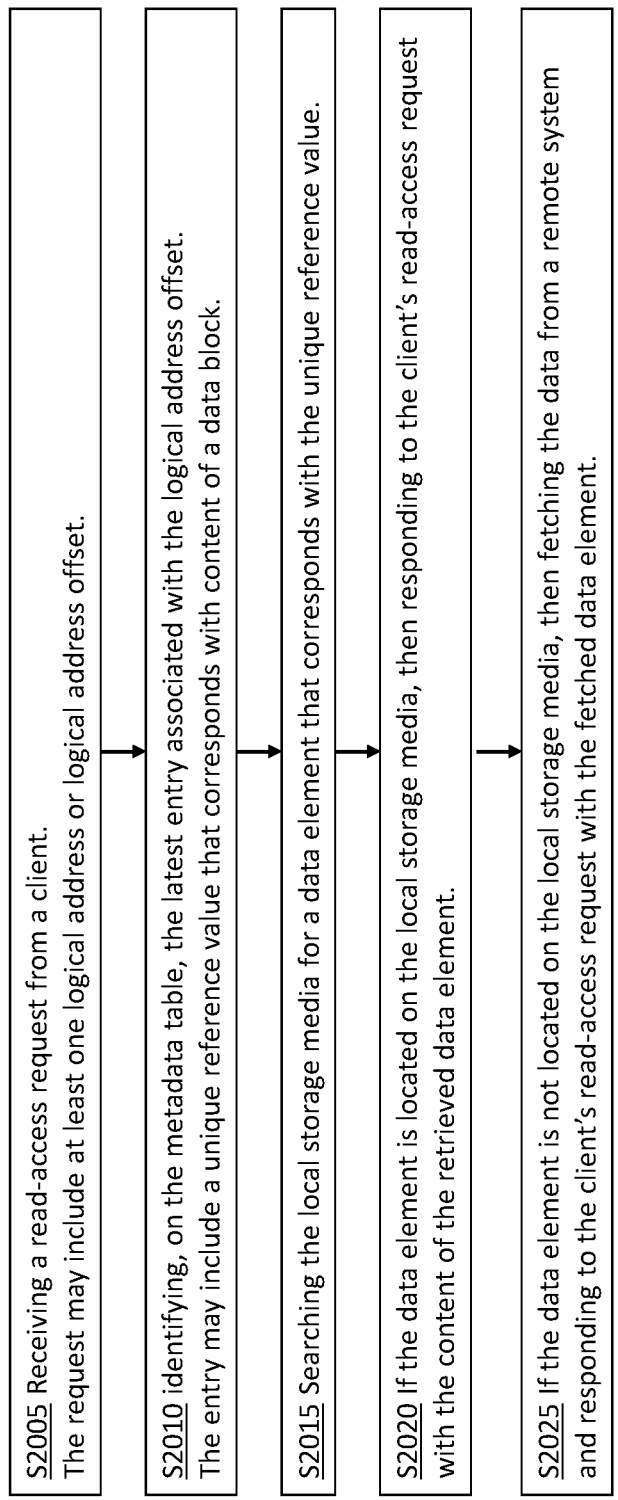
FIG. 7 is a flow diagram depicting handling of a read-access operation by a system for synchronization of data containers according to some embodiments of the invention.

Reference is now made to FIG. 7, which is a flow diagram depicting handling of a read-access operation by a system 400 for synchronization of data containers 133, according to some embodiments of the invention.

As shown in step S2005, in some embodiments, a processor or controller (e.g., element 105 of FIG. 1) may receive a read-access request for at least one data element (e.g., element 134 of FIG. 1) from a client 20 (e.g., 20-A, 20-B of FIG. 5). The read-access request may include at least one logical address and/or a logical address offset.

As shown in step S2010, in some embodiments, controller 105 may identify on the TCR the latest entry associated with the logical address and/or logical address offset. The entry may include a URV that may correspond to content of a data block or data element 134.

As shown in step S2015, in some embodiments, controller 105 may search the local storage system (e.g. 130-A) for a data element that corresponds to the URV.

As shown in step S2020, in some embodiments, if the data element is located on the local storage media, controller 105 may respond to the client's 20 read-access request with the content of the retrieved data block. As shown in step S2025, if the data element is not located on the local storage media, controller 105 may fetch the data from a remote storage system or storage device 130 (e.g., 130-B) and may respond to the client's 20 read-access request with the content of the fetched data element 134.

As elaborated herein in relation to FIG. 5, system 400 may be configured to perform synchronization of the TCR on the local storage system.

According to some embodiments of the invention, as part of this synchronization, system 400 may fetch at least one data element 134 from a remote storage system or storage device (e.g., element 130-B of FIG. 5). Subsequent to such synchronization, controller 105 may be configured to, and may thus be ready to facilitate reading of the at least one data element from the local storage system when receiving a read-access request.

Additionally, or alternatively, in some embodiments, as part of this synchronization, system 400 may update the TCR on the local storage system to include at least one reference (e.g., an SSI and/or a URV) corresponding to at least one respective data element 134 stored on a remote storage system or storage device (e.g., element 130-B of FIG. 5). Subsequent to such synchronization, controller 105 may be configured to respond to a read-access request (e.g., from client 20) by providing the at least one reference (e.g., the SSI and/or URV) corresponding to data element 134.

Additionally, or alternatively, in some embodiments, controller 105 may be configured to utilize the at least one reference (e.g., the SSI and/or URV) to read the at least one respective data element 134 stored on a remote storage system or storage device 130-B. Controller 105 may subsequently respond to a read-access request (e.g., from client 20) by providing the content of the at least one respective data element 134.

Figure 8:
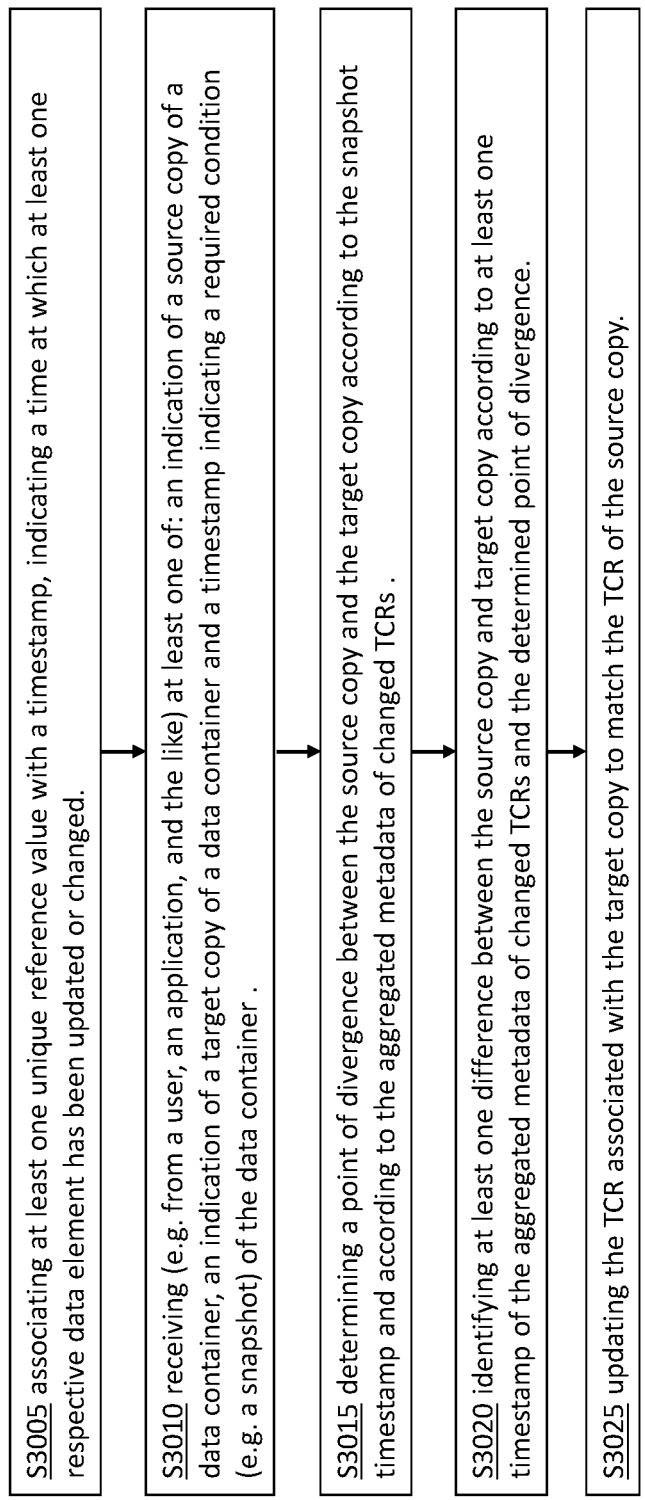
FIG. 8 is a flow diagram depicting handling of a synchronization process between a source copy and a target copy by a system for synchronization of data containers according to some embodiments of the invention.

Reference is now made to FIG. 8, which is a flow diagram depicting handling of a synchronization process between a source copy (e.g., of a data container 133 and/or a data element 134 of FIG. 1) and a target copy (e.g., of the data container 133 and/or the data element 134 of FIG. 1) by a system (e.g., element 400 of FIG. 5) for synchronization of data containers according to some embodiments of the invention.

As shown in step S3005, in some embodiments, a processor or controller (e.g., element 105 of FIG. 1) may associate at least one URV (e.g., element 310 of FIG. 3) of at least one data element 134 with a timestamp, indicating a time at which the respective data element 134 has been updated or changed (e.g., as elaborated herein in relation to Table 3). For example, a user and/or application may overwrite a value of a data element 134 (e.g. a volume block) that may be included within a data container (e.g. a volume). Controller 105 may recalculate a URV corresponding to the overwritten data element 134 according to the changed content as explained herein.

As shown in step S3010, in some embodiments, controller 105 may receive (e.g. from a user, an application, and the like) at least one of: an indication of a source copy of a data container, an indication of a target copy of a data container and a timestamp (e.g., a snapshot timestamp), indicating a required condition (e.g. a snapshot) of the data container.

For example, a user and/or an application may require restoring a local copy of a file to a previous condition in time (e.g. a 'snapshot' condition). The user and/or application may thus provide an indication of their requirement to system 400. The indication may include for example:

a reference (e.g., an SSI and/or a URV) to one or more (e.g., a plurality) copies of the file (e.g., a source copy and one or more target copies), at one or more storage devices or storage systems 130; and a snapshot timestamp at which (or around which) the copies of the required file may have diverged over time.

As shown in step S3015, in some embodiments, controller 105 may determine a point of divergence between a source copy and a target copy of the data container 133 (e.g., the file) according to the snapshot timestamp and according to the aggregated metadata of changed TCRs (e.g., as elaborated herein, in relation to Table 1).

As shown in step S3020, in some embodiments, controller 105 may identify at least one difference between the source copy and target copy according to at least one timestamp of the aggregated metadata of changed TCRs (e.g. Table 1) and the determined point of divergence. Pertaining to the same example, controller 105 may identify at least one data element that may be included in at least one copy of data container 133 (e.g., the file) after the point of divergence between the source copy and target copy.

As shown in step S3025, in some embodiments, controller 105 may update the TCR associated with the target copy to match the TCR of the source copy at the time of the required snapshot (e.g., at the snapshot timestamp). Pertaining to the same example, controller 105 may copy at least one URV from the TCR 131 associated with the source copy 133 to the TCR 131 associated with the target copy 133, to obtain a version that is equivalent to a snapshot of the file at the time indicated by the snapshot timestamp.

In some embodiments, controller 105 may only copy URVs from the TCR associated with the source copy to the TCR associated with the target copy update data according to the determined time of divergence and required snapshot timestamp and thus minimize transfer of data between the source storage system and the target storage system.

In other embodiments, controller 105 may copy at least one URV from the TCR associated with the source copy to the TCR associated with the target copy, to bring or cause the target TCR to be equivalent to the present condition of source TCR As elaborated herein, embodiments of the invention may provide a practical application for managing a storage system and/or synchronizing content of data containers among a plurality of storage systems, locations, media and/or devices. Embodiments of the invention provide several improvements over data storage management and/or data synchronization processes as performed by state-of-the-art storage systems.

For example, as elaborated herein, embodiments of the invention may identify specific data elements (e.g., specific segments or portions of data within data containers) that may require synchronization among storage elements 130. embodiments of the invention may thus facilitate synchronization of stored data among a plurality of storage systems or elements 130 and enable transmission or transfer of a minimal amount of data between a first storage element 130 and a second storage element 130, resulting in improved data availability and reduction of data network congestion.

In another example, embodiments of the invention may facilitate the synchronization by transferring minimal TCR metadata information between data storage elements and avoiding transfer of stored content altogether.

In another example, as elaborated herein, embodiments of the invention may facilitate the synchronization according to the timing of storage of one or more (e.g., all) stored data elements. For example, embodiments of the invention may allow retrieval and/or storage of data according to predefined points in time (e.g., according to snapshot timestamps) and/or retrieval of up-to-date stored content of a data container (e.g., by combining content of up-to-date data elements or segments of the data container).

In another example, as elaborated herein, embodiments of the invention may receive a data access request (e.g., a read access request) from one or more external computing devices (e.g., client devices 20 of FIG. 5). In response to the data access request, embodiments of the invention may select a copy or a version of one or more stored data elements from one or more storage systems or elements 130 (e.g., pertaining to the latest stored data elements). Embodiments may retrieve data from the selected storage system or elements, thus managing a synchronized storage system from the one or more external computing devices point-of-view.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of synchronizing, by at least one processor, between content of a first data container and content of at least one second data container, the method comprising:
    receiving one or more first data elements of the first data container and one or more second data elements of the at least one second data container;
    computing one or more first unique reference values (URVs) for the respective one or more first data elements and computing one or more second URVs for the respective one or more second data elements;
    storing the one or more first data elements on a first storage element and storing the one or more second data elements at a second storage element;
    comparing between a first URV of the one or more first URVs and a second URV of the one or more second URVs to identify data elements having diverged content;
    synchronizing between content of the first data container and content of the at least one second data container based on said comparison;
    maintaining a transportable container representation (TCR) table comprising one or more entries, wherein each entry comprises at least one of: a logical address of a stored data element; a mapping of said logical address to a respective URV; a timestamp indicating a time at which a content of said stored data element has been written; and a storage system identifier (SSI) identifying a storage element in which said data element has been stored;
    receiving a read-access request for a stored data element, the request comprising a logical address;
    identifying a first TCR table entry pertaining to a first stored data element and comprising the logical address;
    identifying a second TCR table entry pertaining to a second stored data element and comprising the logical address;
    comparing between a first timestamp of the first TCR table entry and a second timestamp of the second TCR table entry;
    selecting a TCR table entry based on the comparison; and
    responding to the read-access request based on the selected TCR table entry.

2. The method of claim 1 wherein synchronization between content of the first data container and content of the at least one second data container comprises at least one of:
    copying a content of a diverged data element from the first storage element to the at least one second storage element; and
    copying a TCR table entry pertaining to a diverged data element from the first storage element to the at least one second storage element.

3. The method of claim 1 further comprising:
    comparing between a first timestamp of a first TCR table entry pertaining to a first stored data element and a second timestamp of a second TCR table entry pertaining to a second stored data element, to determine a divergence time in which content of the first data element and content of the second data element have diverged; and
    synchronizing between content of the first data container and content of the at least one second data container based on the divergence time.

4. The method of claim 3, further comprising: receiving a data access request comprising a logical address, wherein comparing between the first timestamp and second timestamp comprises identifying the first TCR table entry and second TCR table entry based on the logical address.

5. The method of claim 3, further comprising: receiving a snapshot timestamp, wherein synchronizing between content of the first data container and content of the at least one second data container is further based on the snapshot timestamp, to cause the content of the at least one second data container to comprise snapshot data corresponding to the snapshot timestamp.

6. The method of claim 3, wherein synchronizing between content of the first data container and content of the at least one second data container comprises: causing the content of the at least one second data container to comprise data corresponding to the later timestamp between the first timestamp and the second timestamp.

7. The method of claim 1 wherein said response comprises at least one of:
    a content of a data element corresponding to the selected TCR table entry;
    an SSI of the selected TCR table entry; and
    a URV of a data element corresponding to the selected TCR table entry.

8. The method of claim 1, wherein at least one of the first storage element and second storage element is a content addressable storage (CAS) device, and wherein storing one or more data elements on a storage element is done using the respective one or more URVs as a content identifier.

9. A method of managing data storage on a plurality of storage elements, the method comprising:
    receiving, at a first timing, a first version of a data element associated with a logical address;
    computing a first URV based on content of the first version;
    storing the first version on a first storage element;

receiving, at a second timing, at least one second version of the data element associated with the logical address;

computing at least one second URV based on content of the at least one second version;

storing the at least one second version on at least one second, respective storage element;

receiving a data access request comprising the logical address;

selecting between the first version and the at least one second version based on at least one of: the first URV, the at least one second URV, the first timing and the second timing;

responding to the received data access request based on the selected version;

maintaining one or more TCR metadata structures, each comprising one or more metadata entries, wherein one or more metadata entries correspond to a stored version of a data element, and wherein one or more metadata entries comprise at least one of: a mapping of a logical address of the data element and a respective URV of the version of the data element; a timestamp corresponding to a time of storage of the version of the data element; and an SSI identifying a storage element in which the version of the data element has been stored;

maintaining a first TCR metadata structure comprising one or more first metadata entries on the first storage element;

maintaining a second TCR metadata structure comprising one or more second metadata entries on the second storage element;

identifying a first metadata entry and a second metadata entry that comprise an equivalent logical address but a different URV; and copying a content of the identified first metadata entry from the first TCR metadata structure to the second TCR metadata structure to synchronize the contents of the first TCR metadata structure and the second TCR metadata structure.

10. The method of claim 9 further comprising:

comparing between contents of one or more metadata entries to determine a condition in which the content of the first version and the content of at least one second version have diverged over time; and retrieving the content of one of the first version and the at least one second version based on the comparison.

11. The method of claim 9 further comprising:

maintaining a first TCR metadata structure on the first storage element;

maintaining at least one second TCR metadata structure on a respective at least one second storage element;

comparing between content of one or more metadata entries of the first TCR metadata structure and content of at least one second TCR metadata structure to determine a condition in which the content of the first version and content of at least one second version have diverged over time; and synchronizing a content of at least one TCR metadata structure based on the comparison.

12. The method of claim 9 further comprising copying a content of a version of a data element corresponding to the first metadata entry from the first storage element to the second storage element to synchronize content of the first storage element and second storage element.

13. The method of claim 9, wherein at least one TCR metadata structure is globally stored on a computing device associated with the first storage element and with at least one second storage elements, and wherein at least one metadata entry of the globally stored TCR metadata structure comprises at least one identifier representing a storage element, so as to associate between a specific logical address, a respective URV and a respective storage element.

14. A method of synchronizing content of a data storage system, the method comprising:

receiving at least one data element;

computing a URV based on a content of the at least one data element;

storing copies of the at least one data element on a plurality of CAS devices according to the URV;

maintaining a TCR, comprising one or more entries, wherein each entry corresponds to a stored copy of a data element and comprises a mapping of a logical address of the stored copy to a respective URV;

comparing between contents of one or more TCR entries to determine a condition in which a content of the stored copies of the at least one data element has diverged over time; and synchronizing content of the at least one stored copy of a data element between a first CAS device and one or more second CAS devices based on the comparison, wherein the TCR is globally stored on a computing device associated with the first CAS device and with the one or more second CAS devices, and wherein at least one entry of the TCR further comprises at least one SSI, indicating a CAS device where a respective copy of a data element is stored, wherein synchronizing the content of the at least one stored data element further comprises:

identifying a first TCR entry and a second TCR entry, wherein the first TCR entry comprises a first logical address, a first URV and a first SSI corresponding to the first CAS device, and wherein the second TCR entry comprises a second logical address, equivalent to the first logical address, a second URV that is different from the first URV and a second SSI corresponding to one of the one or more second CAS devices; and replacing a content of a copy of a data element that corresponds to the second TCR entry on the CAS device corresponding to the second SSI with a content of a copy of a data element that corresponds to the first TCR entry on the CAS device corresponding to the first SSI.

15. The method of claim 14, wherein local copies of the TCR are locally stored on the first CAS device and on the one or more second CAS devices, and wherein synchronizing the content of the at least one stored data element comprises:

identifying one or more TCR entries that comprise an equivalent logical address but a different URV between the local copy of the TCR of the first CAS device and one or more local copies of the TCR of the one or more second CAS devices;

copying a content of the one or more identified TCR entries from the first CAS device to the one or more second CAS devices.

16. The method of claim 15, wherein synchronizing the content of the at least one stored data element further comprises: replacing a content of a stored data element corresponding to an identified TCR entry of the one or more second CAS devices with a content of a stored data element corresponding to the identified TCR entry of the first CAS device.

17. The method of claim 14, wherein maintaining the TCR further comprises: attributing a timestamp corresponding to a time of a change in a value of a stored copy of a data element, and wherein synchronizing the content of the at least one stored copy data element is done according to the timestamp.

18. The method of claim 14, wherein:
at least one received data element is a data container, comprising one or more data segments;
computing a URV is performed per each data segment;
one or more TCR entries comprises a mapping of a logical address of a data segment to a respective URV; and
synchronizing content of a stored data element comprises copying a content of at least one data segment from a first CAS device to one or more second data segments stored on one or more second CAS devices.

19. The method of claim 18, wherein the data container is selected from a list comprising one or more of: a block storage volume, a file and an aggregation of data that is specific to an application, and wherein a logical address of a data segment comprises a logical base address of the data container and an offset that is specific to the data segment.

20. A system for synchronizing between content of a first data container and content of at least one second data container, the system comprising: a non-transitory memory device, one or more modules of instruction code stored in the non-transitory memory device, and a processor associated with the non-transitory memory device and configured to execute the one or more modules of instruction code, wherein upon execution of said one or more modules of instruction code, the processor is further configured to:
receive one or more first data elements of the first data container and one or more second data elements of the at least one second data container;
compute one or more first URVs for the respective one or more first data elements and compute one or more second URVs for the respective one or more second data elements;
store the one or more first data elements on a first storage element and store the one or more second data elements at a second storage element;
compare between a first URV of the one or more first URVs and a second URV of the one or more second URVs to identify data elements having diverged content;
synchronize between content of the first data container and content of the at least one second data container based on said comparison;
maintain a transportable container representation (TCR) table comprising one or more entries, wherein each entry comprises at least one of: a logical address of a stored data element; a mapping of said logical address to a respective URV; a timestamp indicating a time at which a content of said stored data element has been written; and a storage system identifier (SSI) identifying a storage element in which said data element has been stored;
receive a read-access request for a stored data element, the request comprising a logical address;
identify a first TCR table entry pertaining to a first stored data element and comprising the logical address;
identify a second TCR table entry pertaining to a second stored data element and comprising the logical address;
compare between a first timestamp of the first TCR table entry and a second timestamp of the second TCR table entry;
select a TCR table entry based on the comparison; and
respond to the read-access request based on the selected TCR table entry.

* * * * *